July 19, 1966  A. L. BAPTIE ETAL  3,261,259
MICROPHOTOGRAPHIC APPARATUS
Filed Nov. 12, 1963  14 Sheets-Sheet 1

Inventors:
Lyle G. Miles
Alexander L. Baptie
By Bair, Freeman & Molinare Attys.

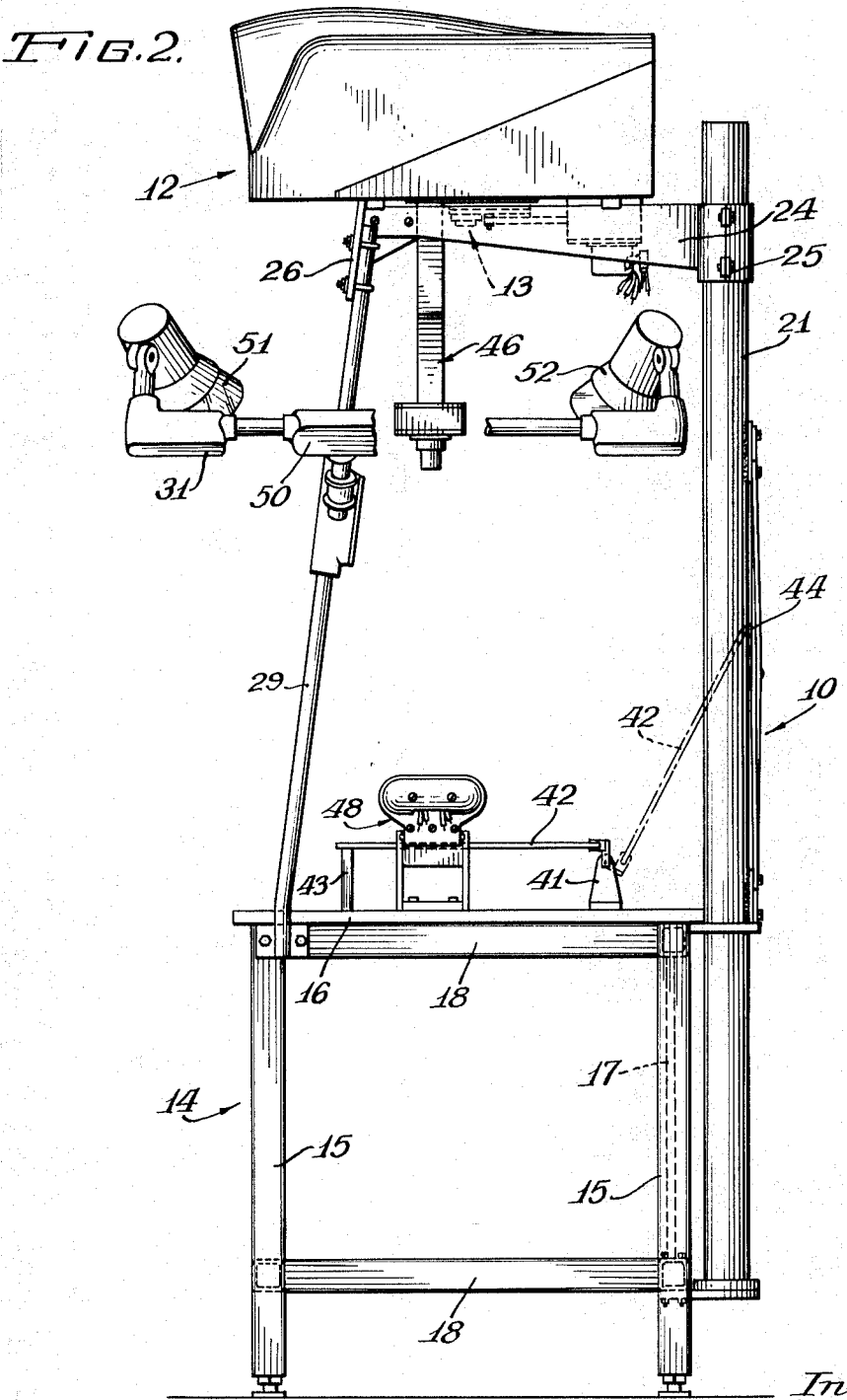

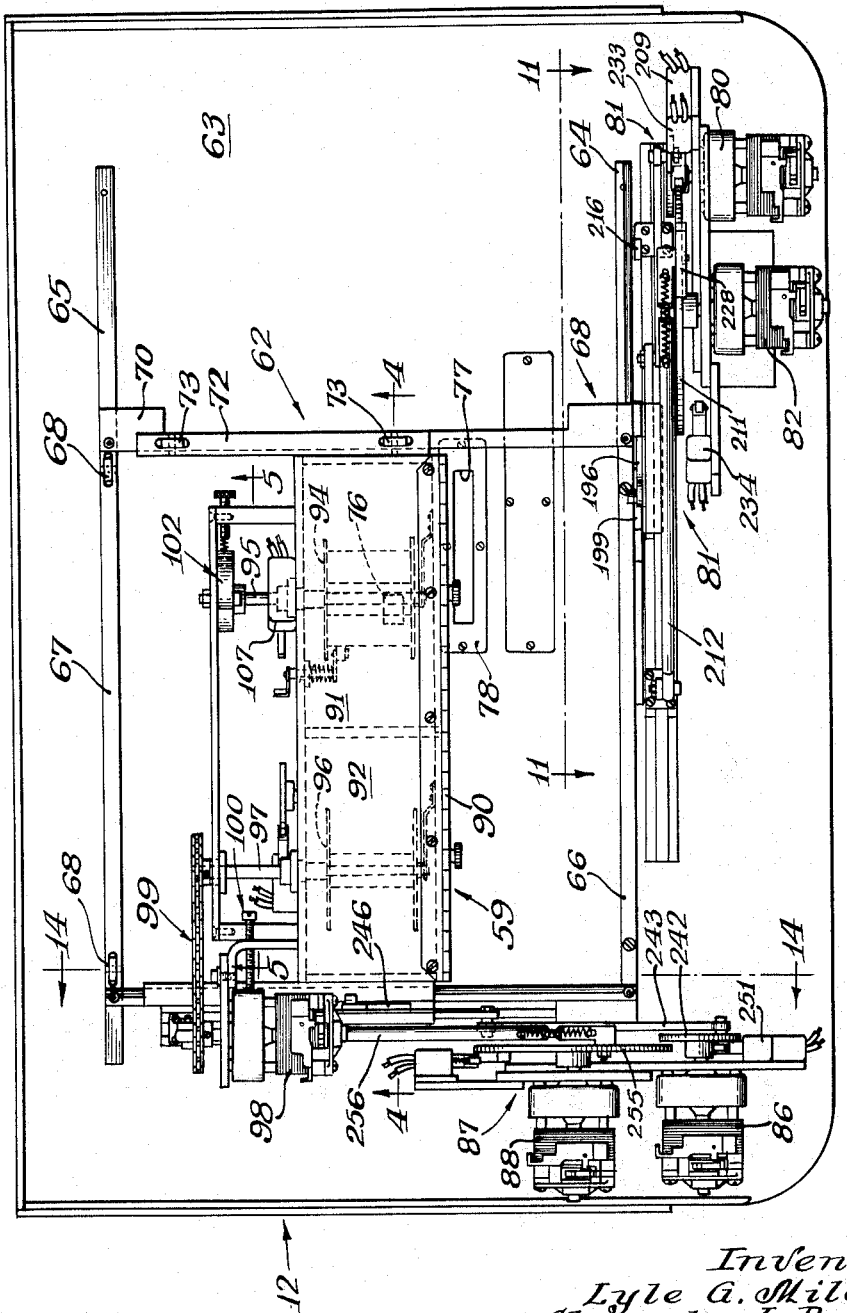

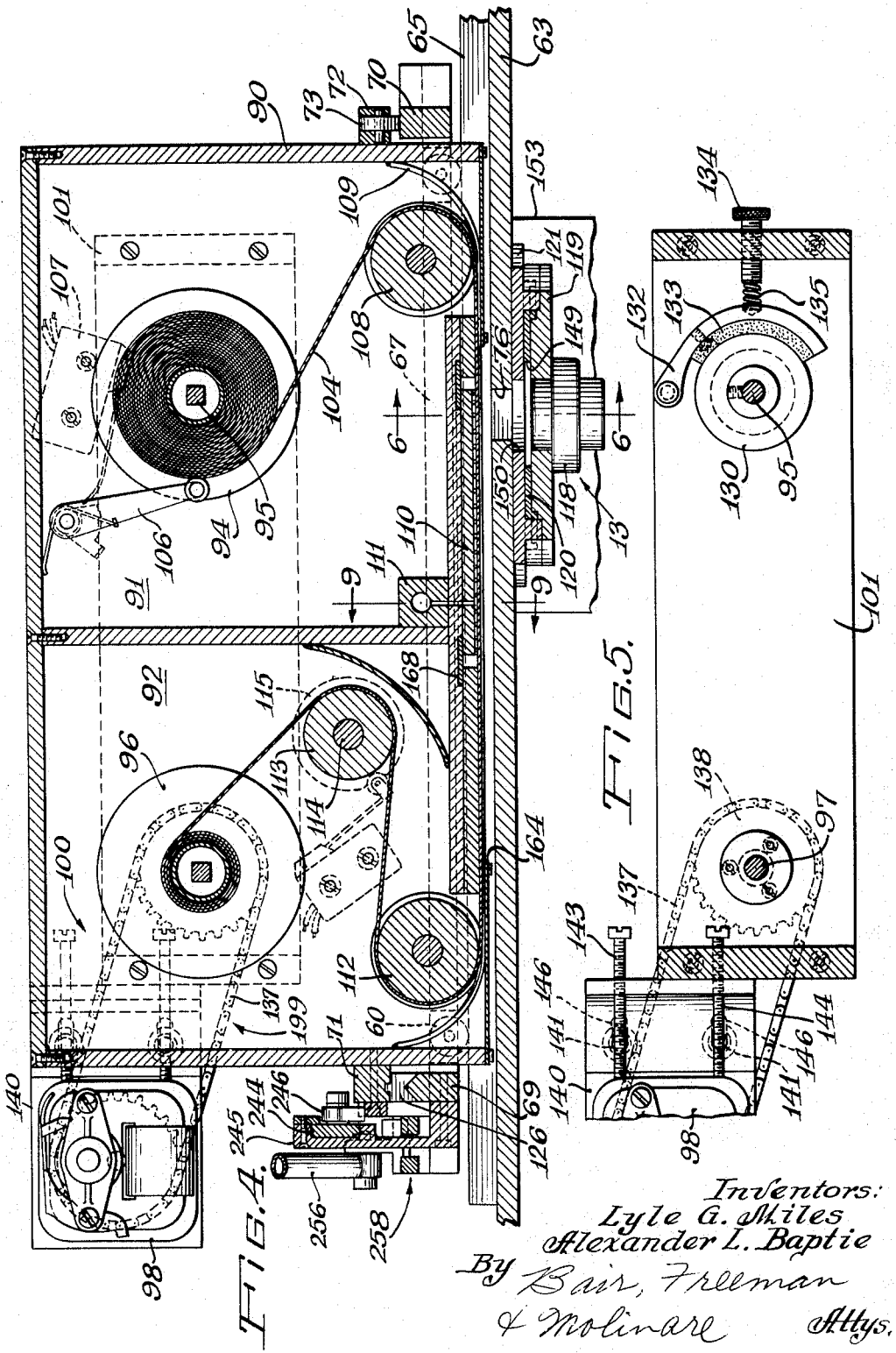

July 19, 1966  A. L. BAPTIE ETAL  3,261,259
MICROPHOTOGRAPHIC APPARATUS
Filed Nov. 12, 1963  14 Sheets-Sheet 5

Inventors:
Lyle G. Miles
Alexander L. Baptie
By Bair, Freeman
& Molinare  Attys.

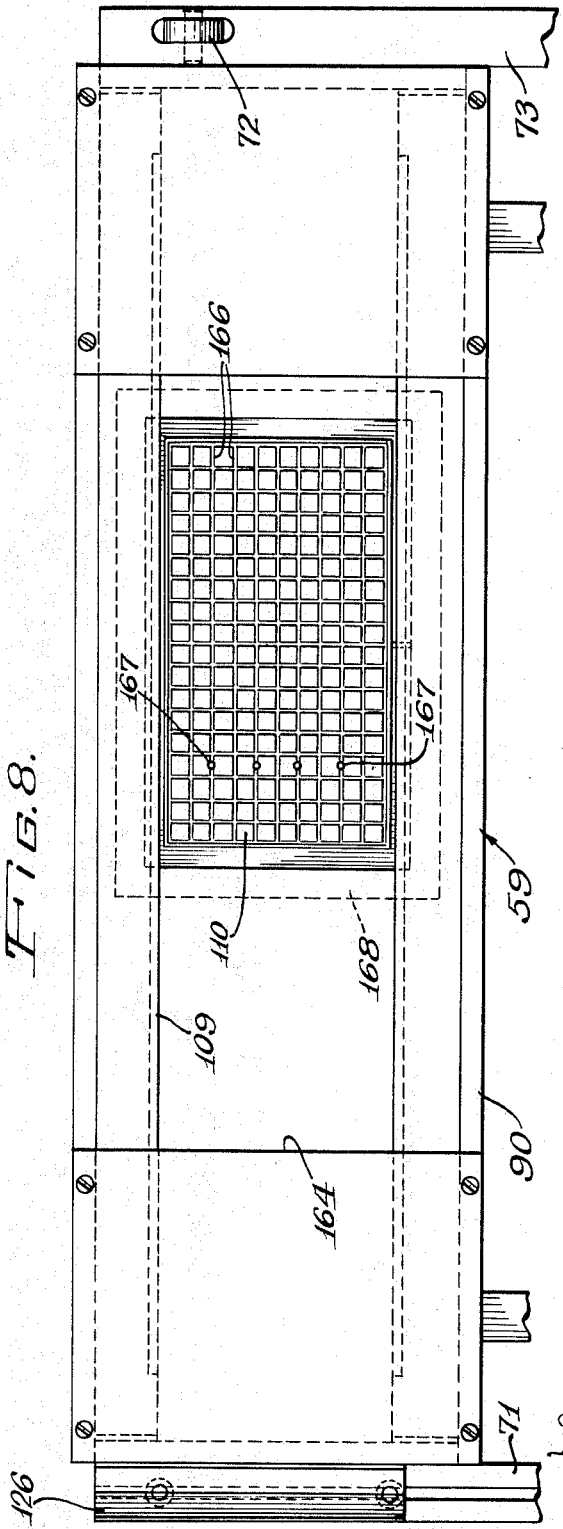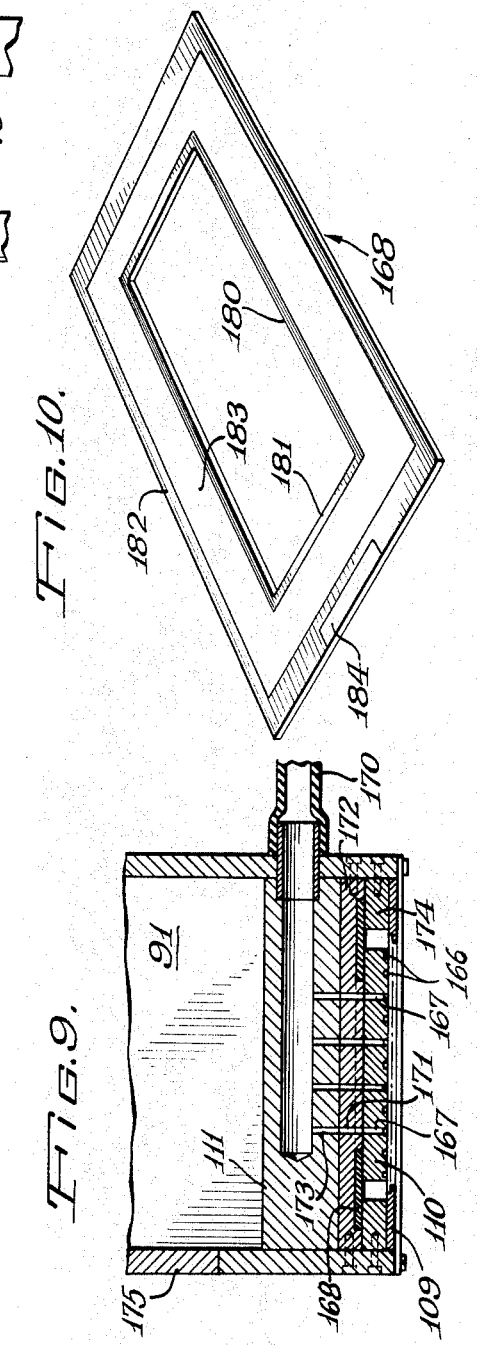

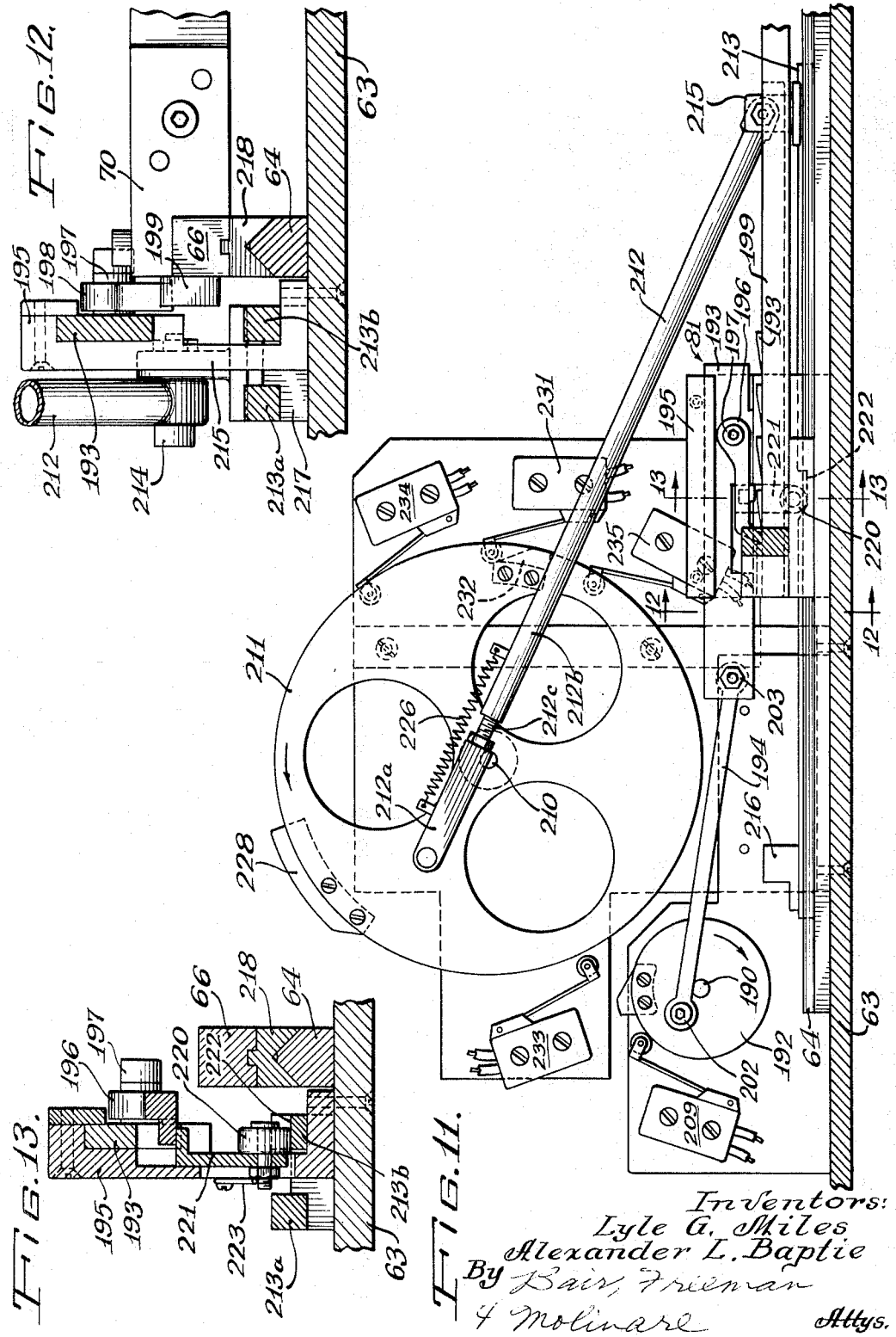

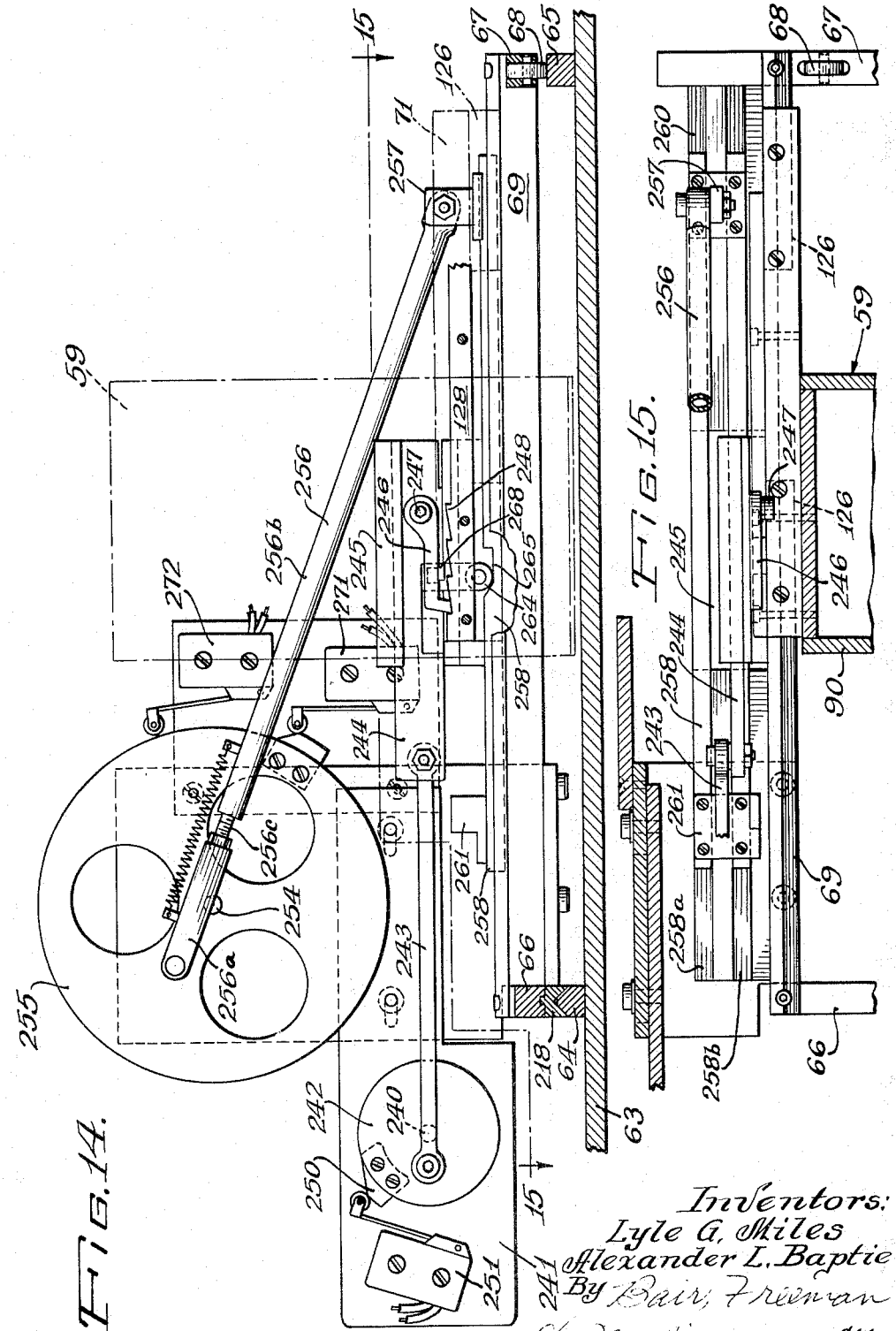

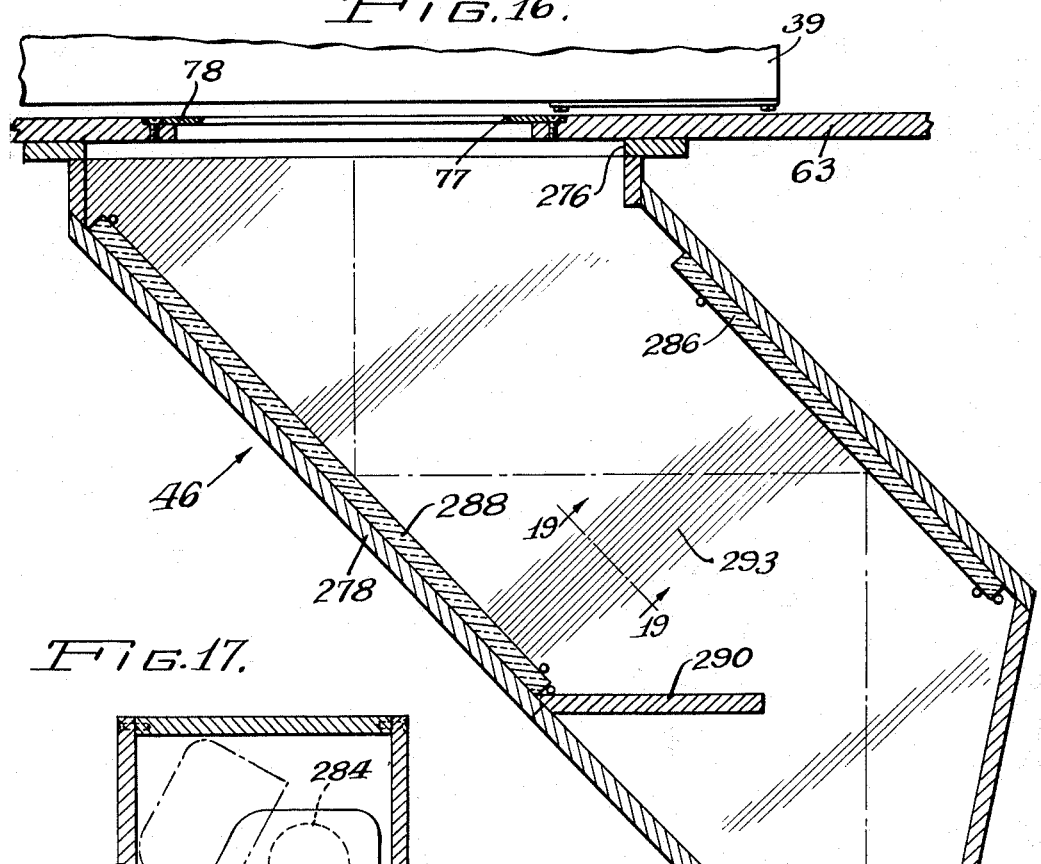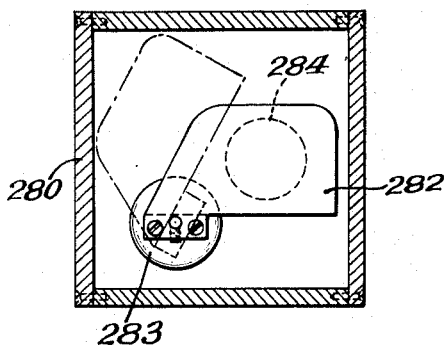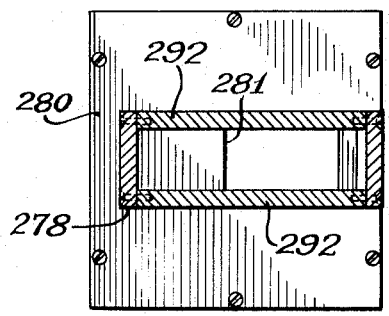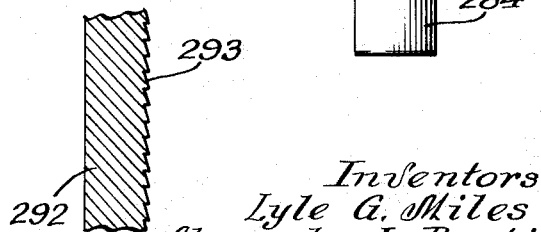

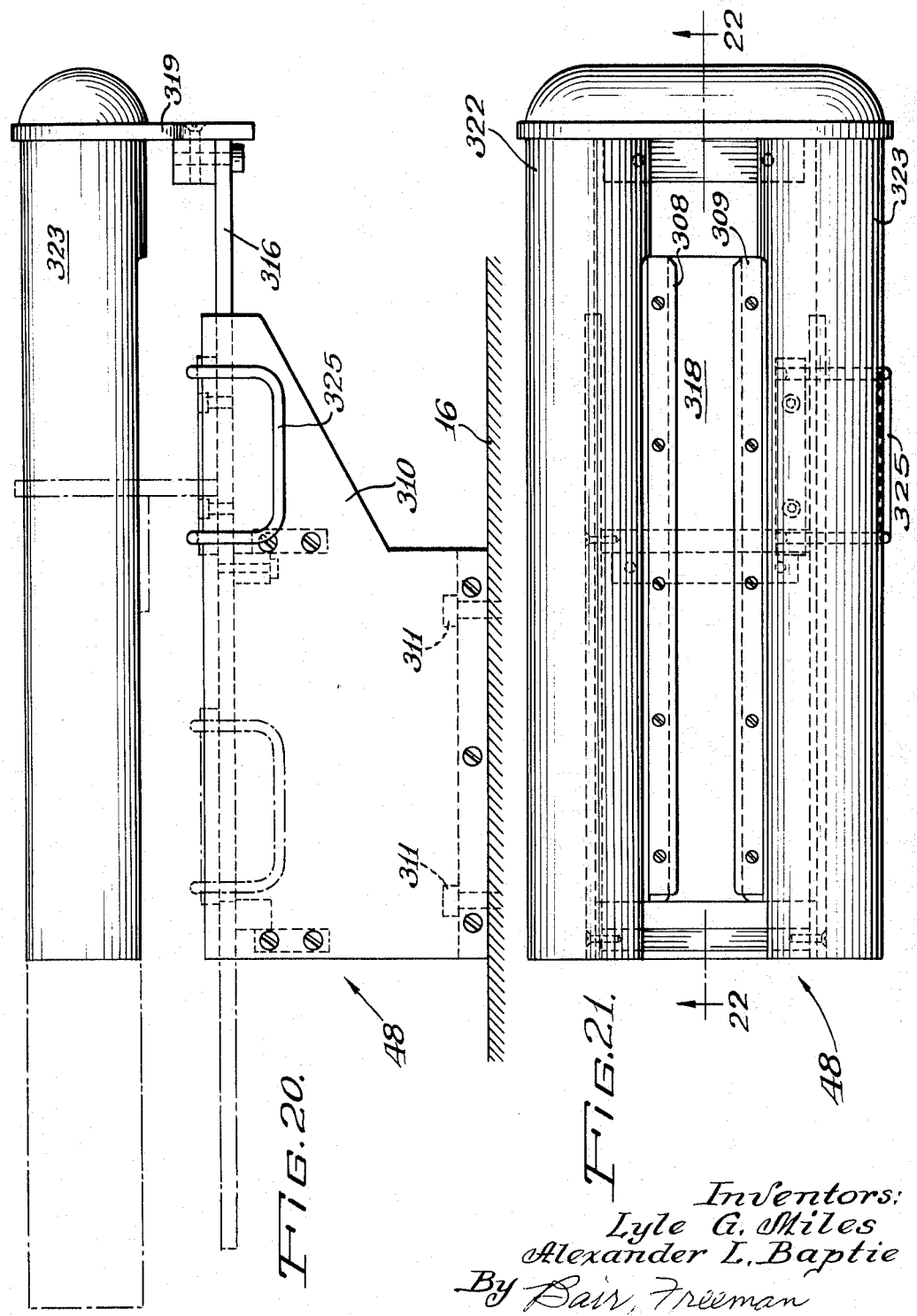

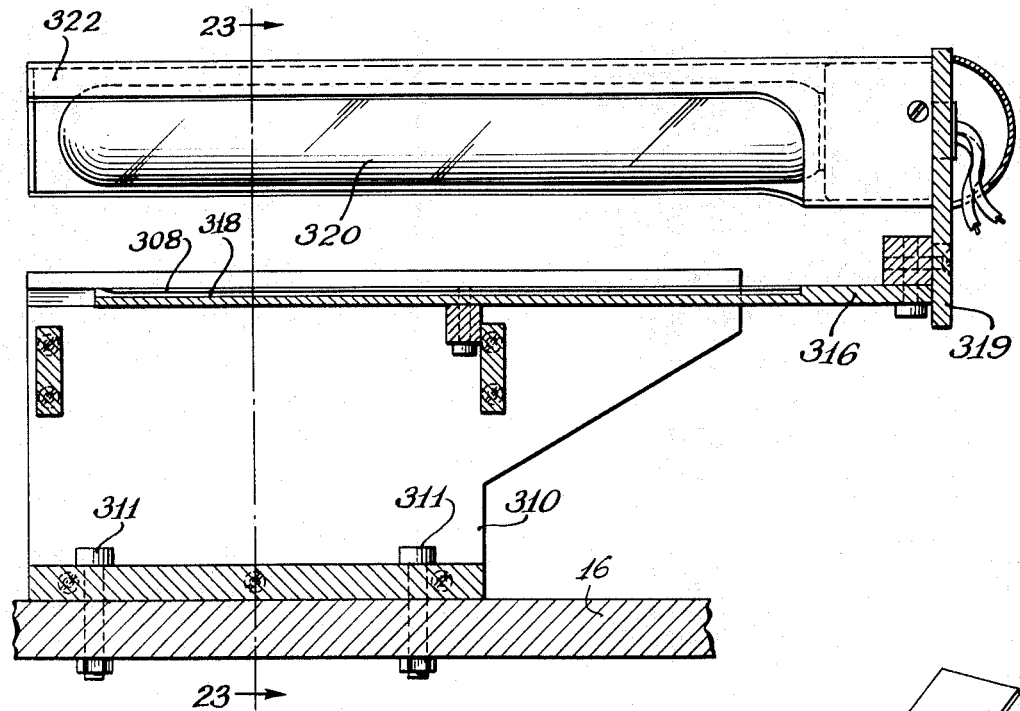
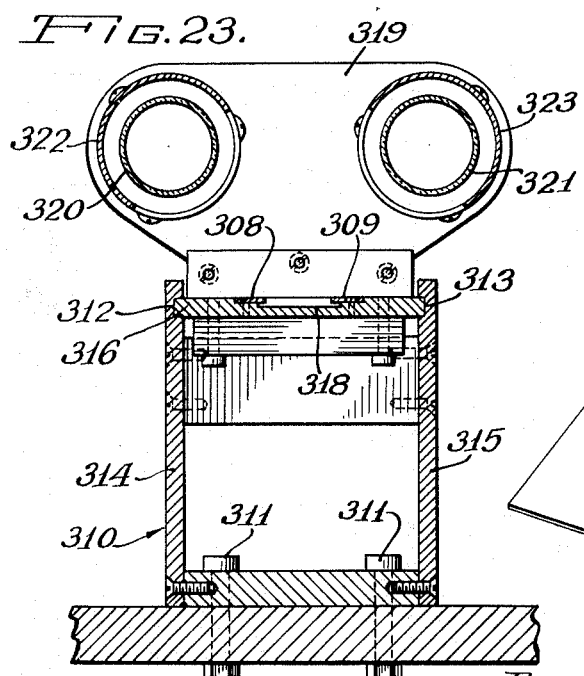
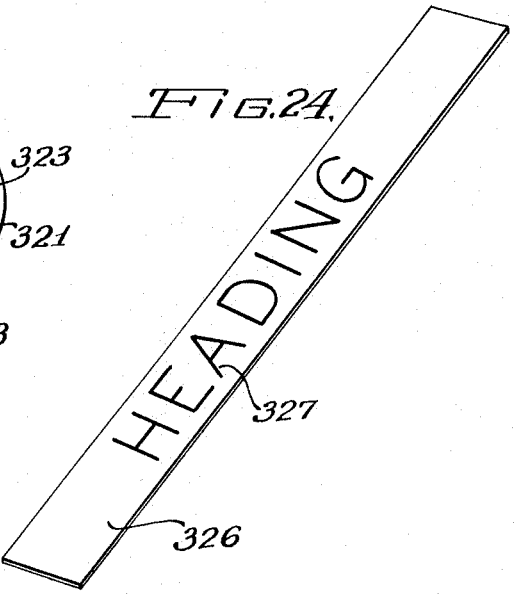

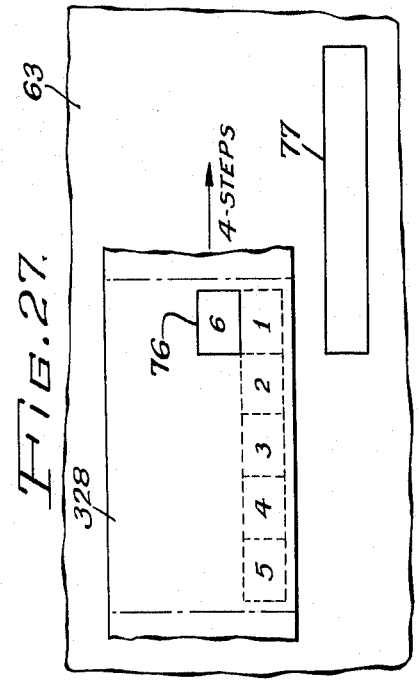
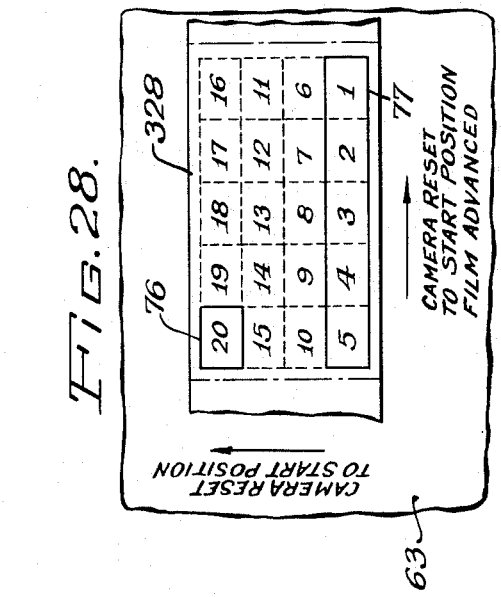
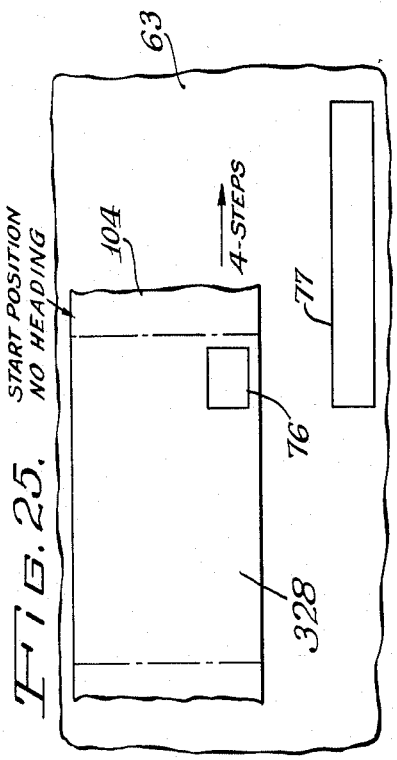
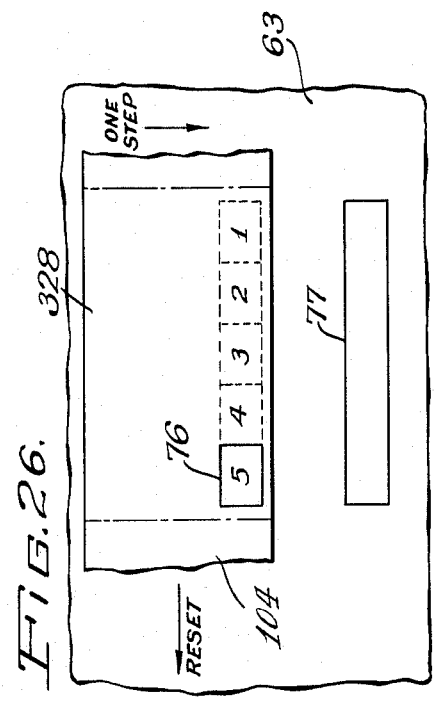

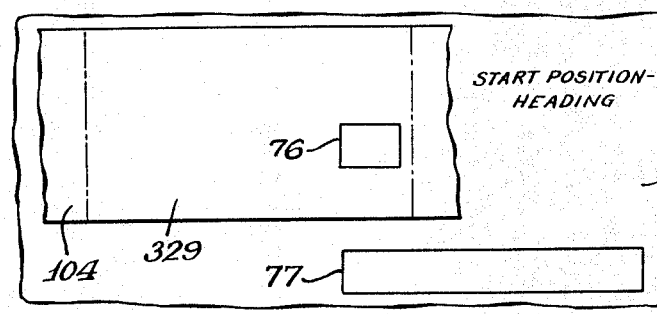
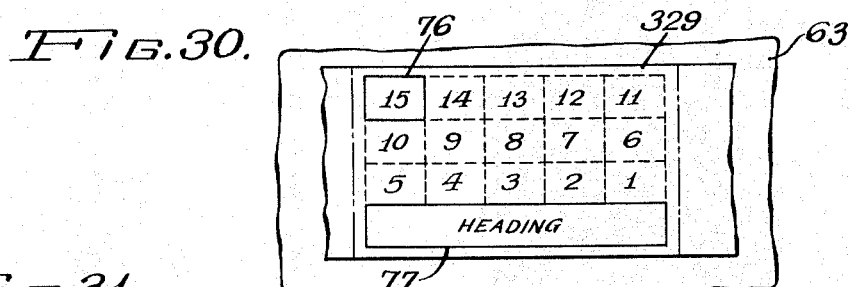
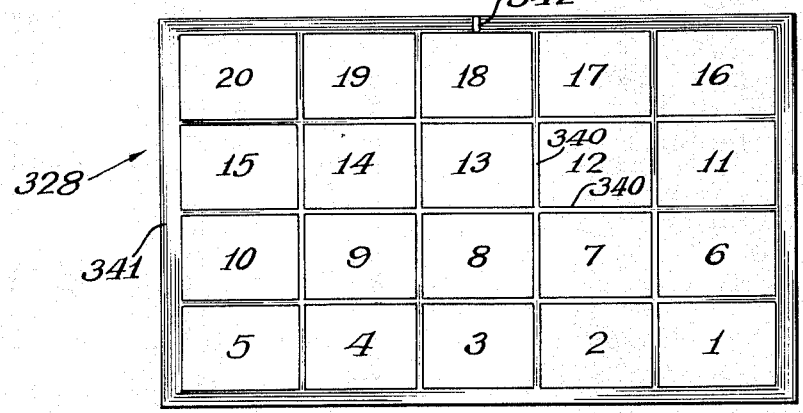
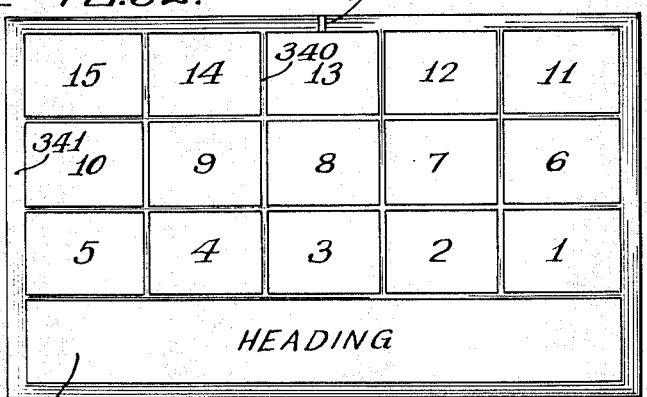

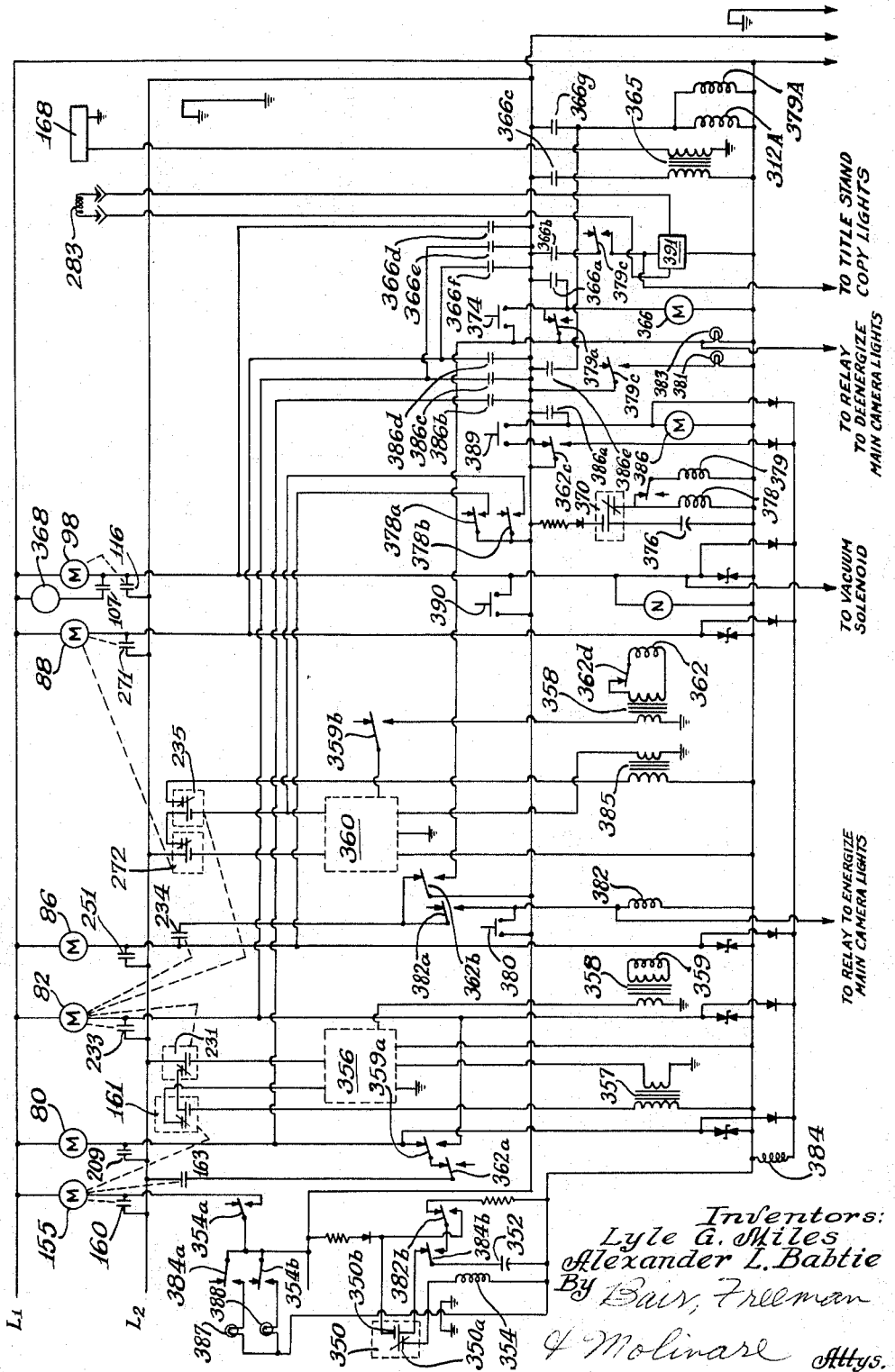

United States Patent Office 3,261,259
Patented July 19, 1966

3,261,259
MICROPHOTOGRAPHIC APPARATUS
Alexander L. Baptie, La Crosse, and Lyle G. Miles, West Salem, Wis., assignors to The Microcard Corporation, West Salem, Wis., a corporation of Wisconsin
Filed Nov. 12, 1963, Ser. No. 322,707
11 Claims. (Cl. 88—24)

This invention relates to microphotographic apparatus and, more particularly, to improved apparatus for exposing a plurality of frames on a panel of photosensitive film in a prearranged orderly pattern.

The proper maintenance and storage of important business records, documents, books and the like is a problem facing a broad spectrum of the business community. In some localities, industrial concerns are building, renting, or leasing warehouse space solely to store their records and the like. Libraries are hard pressed to house the ever expanding volume of new publications.

One important solution to this problem is to photograph copy in reduced size and print the microphotographs on cards. An entire magazine may be photographed on two or three small cards on the order of three inches by five inches. The cards may then be read by utilizing a microphotograph viewer.

Present microphotographic apparatus for preparing negatives suitable for use in printing microphotograph cards is slow and cumbersome to utilize. In addition, due to the very small size of the frames on the film, movement tolerances are critical and alignment problems have arisen in positively aligning the frames on the strip of film. It is very difficult, using individual strips of film for each line, to place them accurately enough so that the individual frames are precisely located on the vertical and horizontal coordinates of the microform. Unless these are accurately located, it would preclude the use of automatic page locating readers, or automatic printout equipment, both of which would operate from frames placed accurately on the coordinates.

Another problem in the use of present day microphotographic cameras has been that it is difficult to apply and orient a heading on the strip of film in an expeditious manner. Often the heading was not properly oriented with respect to the frames. Sometimes, double exposure of a portion of the frames resulted, perhaps rendering a portion of the heading unintelligible.

Thus, an object of the present invention is to provide an improved microphotographic apparatus having means thereon for automatically photographing a plurality of images in a predetermined orderly pattern.

Another object of the present invention is to provide a novel step and repeat microphotographic apparatus comprising a lens mechanism and a film holder, the lens mechanism being fixed with respect to the work or copy to be photographed, and the film holder being movable in a predetermined path parallel to the plane of the work.

Another object of the present invention is to provide an improved microphotographic camera supported on carriage means for automatically positioning the film holder in the camera in a predetermined sequence to photograph a plurality of images on a strip of film in a predetermined pattern.

A further object of the present invention is to provide a microphotographic apparatus including a carriage supporting a film holder of a camera, such carriage being movable in a predetermined manner both longitudinally and transversely with respect to the work to be photographed so as to properly orient the camera film holder to produce a strip of film containing a plurality of images in an orderly predetermined sequence.

Yet another object of this invention is to provide an improved automatic step and repeat camera apparatus having means thereon to facilitate the addition of a heading or like caption to the particular strip of film.

Another object of this invention is to provide a microphotographic apparatus wherein the camera lens is maintained at a constant distance from the work to be photographed and the camera film holder is accurately positioned in a plane parallel to the plane of the work at the end of each exposure.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which like numerals refer to like parts, and in which:

FIGURE 2 is a side view of the microphotographic apparatus of FIGURE 1;

FIGURE 3 is a top plan view of the step and repeat camera embodied in the present invention, taken generally along the line 3—3 of FIGURE 1, and more clearly illustrating the carriage means for moving the film holder of the camera both longitudinally and transversely with respect to the work to be photographed;

FIGURE 4 is a cross-sectional view on an enlarged scale of the step and repeat camera taken generally along the line 4—4 of FIGURE 3;

FIGURE 5 is a detail sectional view taken generally along the line 5—5 of FIGURE 3, more clearly illustrating the connection of the film drive motor to the film drive shaft;

FIGURE 8 is a bottom view of the film holder of the step and repeat camera illustrating the vacuum platen for holding the strip of film securely during an exposure sequence;

FIGURE 9 is a detail cross-sectional view of the film holder taken generally along the line 9—9 of FIGURE 4;

FIGURE 10 is a perspective view of the panel structure for producing a predetermined border on a panel of film;

FIGURE 11 is a cross-sectional view of the carriage means taken generally along the line 11—11 of FIGURE 3, more clearly showing the frame advance and return mechanism of the present invention;

FIGURE 12 is a cross-sectional view of the carriage means taken generally along the line 12—12 of FIGURE 11;

FIGURE 13 is a cross-sectional view of the carriage means taken generally along the line 13—13 of FIGURE 11;

FIGURE 14 is a cross-sectional view of the carriage means taken generally along the line 14—14 of FIGURE 3, more clearly showing the line advance and return mechanism of the present invention;

FIGURE 15 is a cross-sectional view taken generally along the line 15—15 of FIGURE 14, more clearly illustrating the guide track for the line advance and return mechanism;

FIGURE 16 is a cross-sectional view of the lens mechanism attachment for photographing the headings or titles to be applied to a panel of film;

FIGURE 17 is a cross-sectional view of the lens mechanism attachment taken generally along the line 17—17 of FIGURE 16, more clearly illustrating the rotary shutter mechanism;

FIGURE 18 is a cross-sectional view of the lens mechanism attachment taken generally along the line 18—18 of FIGURE 16, more clearly illustrating the shutter aperture;

FIGURE 19 is a cross-sectional view of the lens mechanism attachment taken generally along line 19—19 of FIGURE 16, more clearly illustrating the surface configuration of a wall of the lens mechanism attachment housing;

FIGURE 20 is a side view of the title stand, which is adapted to be supported on the base of the microphotographic apparatus adjacent to the means for holding the copy or work to be photographed;

FIGURE 21 is a top view of the title stand illustrated in FIGURE 20;

FIGURE 22 is a cross-sectional view of the title stand taken generally along line 22—22 of FIGURE 21;

FIGURE 23 is a cross-sectional view of the title stand taken generally along the line 23—23 of FIGURE 22;

FIGURE 24 is a perspective view of a title adapted to be inserted into the title stand;

FIGURES 25 through 28 illustrate schematically the sequential exposure of a panel of photosensitive film to produce the desired frame pattern;

FIGURES 29 and 30 illustrate schematically the sequential exposure of a panel of photosensitive film when a title or heading is to be applied thereto;

FIGURE 31 is a plan view of a portion of film illustrating the pattern of frames on the film when a heading is not utilized;

FIGURE 32 is a plan view of a portion of film illustrating the pattern of frames thereon when a title is utilized on such portion of film; and FIGURE 33 is a schematic wiring diagram of the microphotographic apparatus of the present invention.

Figure 1:
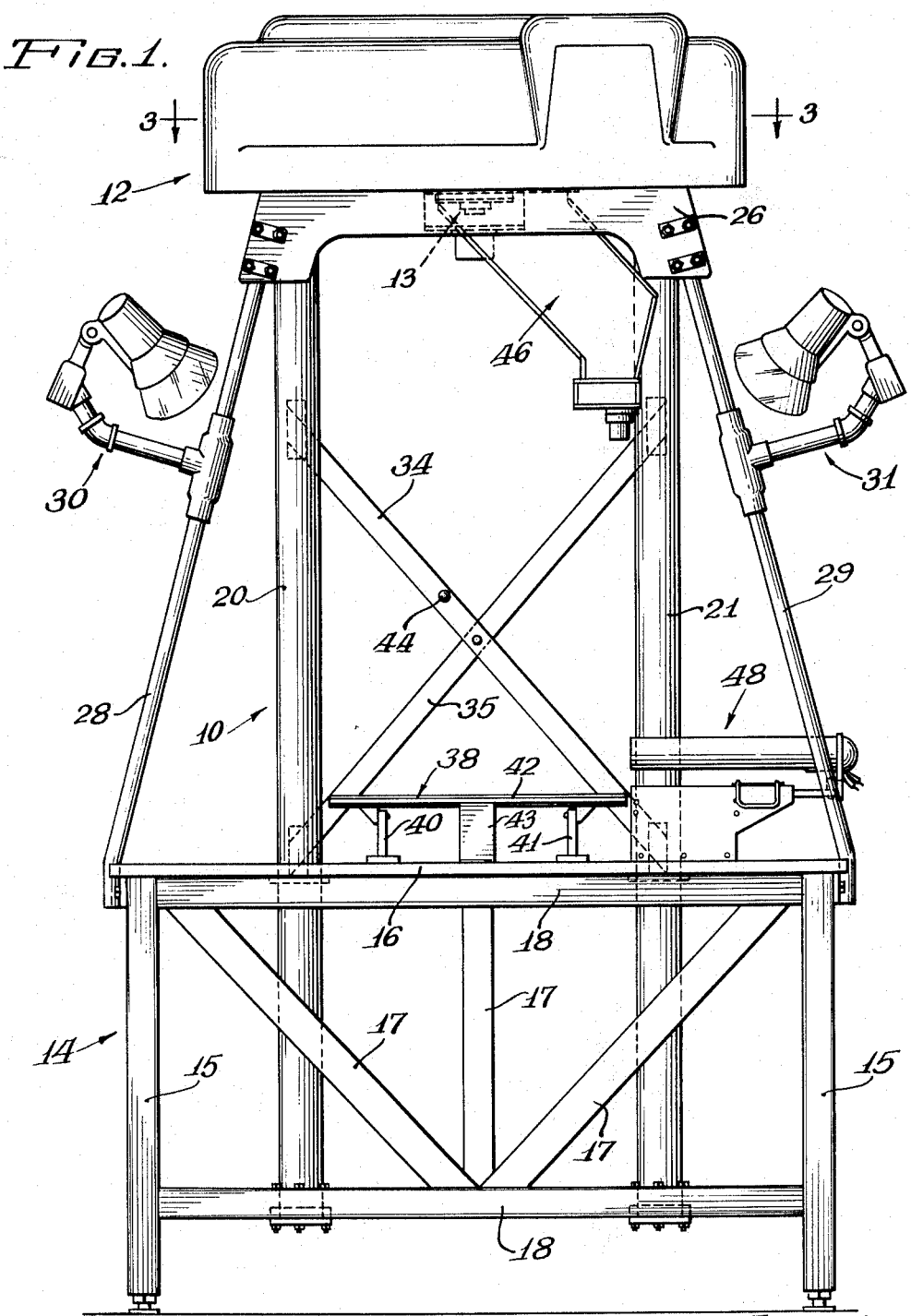
FIGURE 1 is a front elevation view of a microphotographic apparatus embodying the present invention.

Referring to FIGURES 1 and 2, there is illustrated the microphotographic device of the present invention. Carried on the frame means 10 is a step and repeat camera mechanism 12. The frame means comprises a table 14 having a plurality of legs 15 adjustably supporting the table on the floor and a top 16 upon which the copy to be photographed may be supported. The table may be rigidified by suitable brace members 17 and cross members 18.

The frame structure includes a pair of upright support members 20 and 21 affixed to the rear of table 14. Cross members 34 and 35 are provided to brace the upright support members 20 and 21.

Extending forwardly from the upright members 20 and 21 adjacent the top thereof are arms 24. The arms 24 are adjustably connected to the members 20 and 21 by suitable fastening or clamping means 25. The front ends of arms 24 are braced by tubular or rod-like members 28 and 29, which are interconnected across the top thereof by bracket 26. Carried on the members 28 and 29 are light means 30 and 31 for properly illuminating the work or copy to be photographed.

Affixed on the top 16 of the table 14 is a support means 38 for orienting the work to be photographed at a predetermined plane with respect to the step and repeat camera and at a predetermined focal distance from the lens of the camera. The support means comprises a pair of brackets 40 and 41 affixed to the top 16 of table 14 and a transparent planar support plate 42 pivotally carried on the brackets 40 and 41. The support plate is preferably made from glass or a clear plastic. If a single sheet is to be photographed, the sheet may be placed on top of the support plate 42. On the other hand, if a book or catalog containing a plurality of pages is to be photographed, then the book or catalog may be suitably wedged beneath the bottom of the support plate. A support 43 may be provided to hold the free end of support plate 42 at a predetermined distance from the top of the table 14. When the support plate 42 is pivoted fully open (the position indicated in dotted lines in FIGURE 2) to facilitate mounting copy beneath the camera, it engages a bumper 44 made of a rubber or a like resilient material for preventing scratching or marring of support plate 42.

The step and repeat camera of the present invention, which comprises a lens mechanism 13 fixed in a horizontal plane with respect to the work to be photographed and a film holder movable in a plane horizontal to the plane of the work, is adapted to expose a strip of photosensitive film to a plurality of images in a predetermined orderly pattern. The lens mechanism 13 is mounted on frame 14 at a predetermined fixed focal distance from the copy to be photographed. The distance is determined by the characteristics of the lens used. Though a presently preferred form of the invention will be described for exposing twenty frames or fifteen frames and a heading on a predetermined length of film, it will be understood that the apparatus can easily be adapted to handle film of different size and therefore to expose a greater or a lesser number than twenty frames on a single panel or section of film.

The attachment for photographing the heading or title on a strip of film includes a lens mechanism 46 operatively connected to and movable with the step and repeat camera 12 and a title stand 48 affixed on the top of the table 14 adjacent to the work support means 38.

As seen in FIGURE 2, the light means 31 may comprise a light bar 50 operatively connected to a brace 29, such light bar 50 carrying at the ends a pair of reflector lights 51 and 52.

Referring to FIGURE 3, there is illustrated a plan view of the step and repeat camera mechanism 12 with the cover removed to better illustrate the carriage structure for actuating the film holder 59 of camera 12 so as to produce a plurality of separate images or frames on a strip of film in an orderly prearranged pattern. The carriage structure includes a frame advance and return carriage 60 for moving the film holder 59 longitudinally with respect to the work to be photographed, and a line advance and return carriage means 62 for moving the film holder transversely with respect to the work to be photographed. It is seen that the carriage means 60 and 62 move in planes which are parallel to the plane of the work supported on or beneath plate 42.

The carriage means 60 are supported and guided upon the frame or base 63 of the step and repeat camera support structure for movement in a plane parallel to the plane of plate 42 by means including a guide track 64 and a roller track 65. The carriage 60 comprises a slide rail 66 movable along guide track 64 affixed to base 63, a roller rail 67 journalling rollers 68 which are in engagement with and movable along roller track 65, a guide track 69 and a roller track 70. In plan view, the members of the carriage means 60 define a right parallelogram.

Supported upon the first carriage means 60 for movement transversely of the work is a second carriage means 62 which is adapted to support the film holder 59 thereon. Carriage means 62 comprises a slide rail 71 operatively engaging guide track 69 on carriage means 60 and a roller rail 72 journalling a plurality of rollers 73, which are in engagement with and movable along roller track 70 of carriage 60. The ends of film holder 59 are connected to the slide rail 71 and the roller rail 72 of the carriage means 62. Thus, the housing of the film holder or film box 59 functions to interconnect the rails 71 and 72 and complete the carriage 62.

Power means are provided for effecting a predetermined sequential movement of each of the carriage means. The power drive for the first carriage means 60 includes a frame advance or longitudinal advance drive motor 80 operatively connected to the first carriage means by pawl and ratchet drive means 81. Frame return drive motor 82 is operatively connected to the rail 66 for moving carriage means 60 in a reverse direction and for returning the first carriage means to its starting position at the termination of a predetermined sequence of operation.

The drive means for the second carriage means 62 includes a line advance or transverse drive motor 86 operatively connected to the second carriage means by a pawl and ratchet mechanism 87 and a line return or transverse return drive motor 88 operatively connected to the rail 71 for returning the second carriage means 62 to its starting position at the conclusion of a predetermined cycle of operation.

The camera mechanism 12 includes film holder 59 comprising a casing or housing 90 operatively carried on the carriage means 62. The housing is divided into a pair of compartments 91 and 92 by wall 93. Rotatably supported within compartment 91 of the housing 90 is a supply reel 94. The supply reel 94 is fixed to shaft 95 for rotation therewith. Take-up reel 96 is disposed in compartment 92. The take-up reel is carried on and fixed to shaft 97. The film is moved from the supply reel 94 onto the take-up reel 96 by means of the camera take-up drive motor 98, which is operatively connected to the shaft 97 upon which the take-up reel 96 is supported by a chain and sprocket drive arrangement 99. The tension in the chain of the chain and sprocket drive construction 99 may be adjusted by suitable chain tensioning adjustment means 100.

Provided in the base plate 63 is an aperture 76 for permitting exposure of a single frame on the panel of film to be exposed. Also defined in the base is a title aperture 77 for permitting exposure of a title strip or heading upon the panel of film to be exposed.

FIGURE 4 is a cross-sectional view of the film holder 59 of camera 12. It is seen that the film supply reel 94 is operatively affixed to an end of shaft 91, which end is preferably of a noncircular configuration, and complementary to the shape of the opening in the hub of the reel 94. Associated with the reel 94 is a pivoted arm 106 which is adapted to be biased counterclockwise as viewed in FIGURE 4 to actuate a switch mechanism 107 when the supply of film reaches a predetermined low level to actuate a suitable signal, as for example, a buzzer or a signal light. The film from the supply reel 94 is trained over an idler roller 108 and between the idler roller and a guide 109. The film is passed between a vacuum platen 110 and guide 109. The platen 110, which is connected to a suitable suction source, assists in fixing the film more positively in a predetermined position during the exposure and sequencing operation. The film then passes over an idler roller 112 and metering roller 113 and is then wound upon the take-up reel 96. Fixedly secured on the shaft 114 for rotation with the metering roller 113 is a cam 115 which is adapted to actuate a switch mechanism 116 for terminating operation of the film take-up drive motor 98 at the end of one cycle of operation (at the end of one revolution of the cam 115).

Depending from the bottom of frame 63 is the lens mechanism 13. The lens mechanism comprises a lens 118 supported on a frame 119. Frame 119 is in turn connected to frame 121 which is affixed to frame structure 63. Movable shutter 120 is supported between frames 119 and 121. As aforenoted, the film housing 90 of camera 12 is movable longitudinally and transversely on the frame structure 63 with respect to the lens and shutter mechanism 13, which is fixedly carried on the bottom of frame structure 63 at a predetermined focal distance from the plane of the work to be photographed.

Referring again to FIGURE 4, there is illustrated the manner of supporting the film box or housing 90 on the carriage structure. As aforenoted, the first carriage means 60 is supported for movement on the frame 63 along a guide track 64 and a roller track 65. The roller rail 67 of carriage 60 journals rollers 68, which support the rail for movement along the roller track 65. The carriage means 60 also includes a pair of transversely disposed members 69 and 70.

Affixed to one side of the film box 90 is a roller rail 72 which journals thereon a pair of rollers 73. These rollers are adapted to engage and move along the top of the roller track 70 on the first carriage means 60.

Affixed at the other side of the film housing 90 is a slide rail 71, which has a bearing block 126 fixedly connected to the bottom thereof. The bearing block 126, which is preferably made of bronze, engages and slides along the V-shaped surface of guide track 69 carried on the first carriage means. It is noted that the block 126 is provided with a recess complementary to the configuration of the top of guide track 69. From the foregoing, it is evident that the film holder 90 is carried with the second carriage means 62 for movement transversely of the work supported on the frame structure 14. The second carriage means 62 is operatively supported and guided on the first carriage means 60 for movement longitudinally of the work supported on frame means 14.

In FIGURE 5, there is illustrated a portion of the mechanism for moving film through film holder 59. Operatively affixed at the outer end of the shaft 95 which supports the film supply reel 94 is a roller 130. The roller 130 is engaged along a portion of its outer periphery by a pivoted brakeshoe 132, which has affixed on the face thereof a suitable lining material 133. The brakeshoe 132 is maintained in frictional engagement with the periphery of roller 130 by means of adjustment screw 134 which extends through a tapped opening in the bracket 101 and engages a spring 135 for biasing the brakeshoe into engagement with the roller 130. By this construction, a frictional drag is imposed upon the supply reel 94 and lost motion in the film is obviated. The film will be maintained in tight engagement with each of the rollers 108, 112 and 113 over which the film is trained.

The film wind or takeup motor 98 is operatively connected to the takeup shaft 97 by means which include a chain 137 and a sprocket 138 affixed to the shaft 97. The motor 98 is supported from the housing 90 and bracket 101 by a support arm 139 which is connected to the motor bracket 140 by suitable fastening means 141, as for example, a bolt and a nut. Chain tensioning adjustment means 100 are provided to adjust the position of motor 98 with respect to the shaft 97 and thereby adjust the tension of chain 137. The adjustment means 100 include a pair of adjustment screws 143 and 144 which are threadedly engaged in tapped openings in support arm 139 intermediate the ends thereof. The rear of each adjustment screw abuts the frame of motor 98. Provided in the motor bracket 140 are a plurality of elongated openings 146 for each of the fastening means 141. When the fastening means 141 are loosened, the adjustment screws 143 and 144 may be rotated to move the motor bracket 140 and the motor 98 carried thereon with respect to the support arm 139. Upon attainment of the desired chain tension, the fastening means 141 may be tightened to secure the motor 98 in place.

Figure 6:
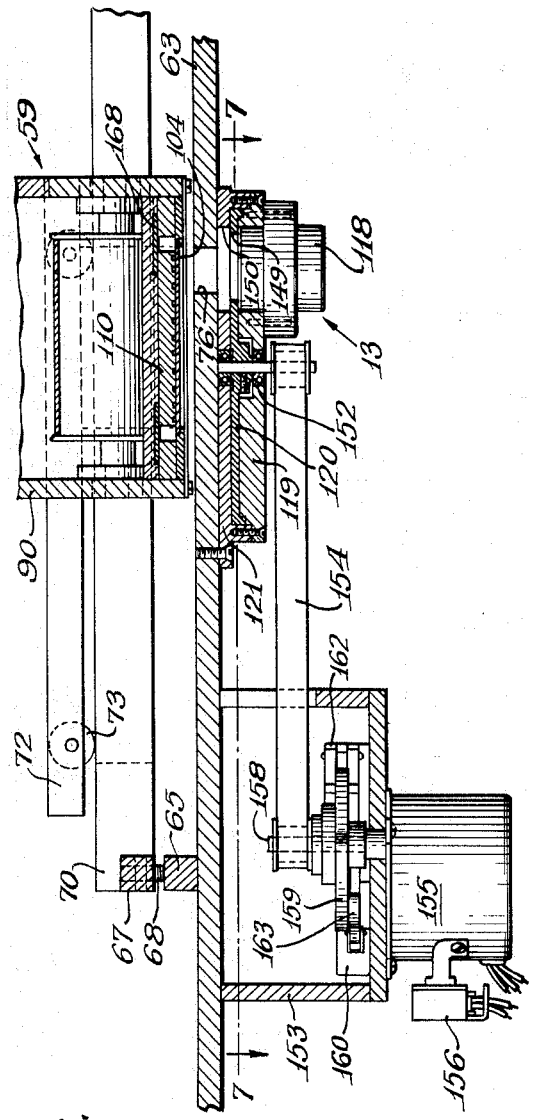
FIGURE 6 is a cross-sectional view taken generally along the line 6—6 of FIGURE 4, more clearly illustrating the shutter drive mechanism.

Referring to FIGURE 6, there is illustrated the relationship between the film holder 59 and the lens mechanism 13, as well as the shutter drive mechanism. The film holder may be moved to selectively position the film panel to be exposed over aperture 76 in base 63. The lens mechanism 13 is affixed to base 63 at a predetermined distance from the copy supported on table 14. Movable shutter 120 within the lens mechanism regulates the exposure of the film to the copy. Provided in the shutter 120 which is rotatably supported between the frames 119 and 120 is a shutter opening 149. The shutter opening 149 is in alignment with an opening 150 in the frame 120 and aperture 76 in base 63. The film panel retained by the vacuum plate 110 will be sequentially exposed to the copy by virtue of the periodic operation of the rotary shutter mechanism 120. It is noted that the shutter 120 is journaled in bearings 152 supported in the frames 119 and 120.

The means for driving the shutter 120 comprises a shutter motor 155 operatively connected to the shutter 120 by means of belt and pulley drive 154. The shutter drive motor 155 depends from a housing 153 affixed to the frame structure 63. Carried on the housing of the shutter drive motor 155 and electrically connected in circuit with the shutter drive motor 155 is a relay 156 for controlling actuation of the motor 155. The operation of this relay mechanism will be more fully explained hereafter.

Figure 7:
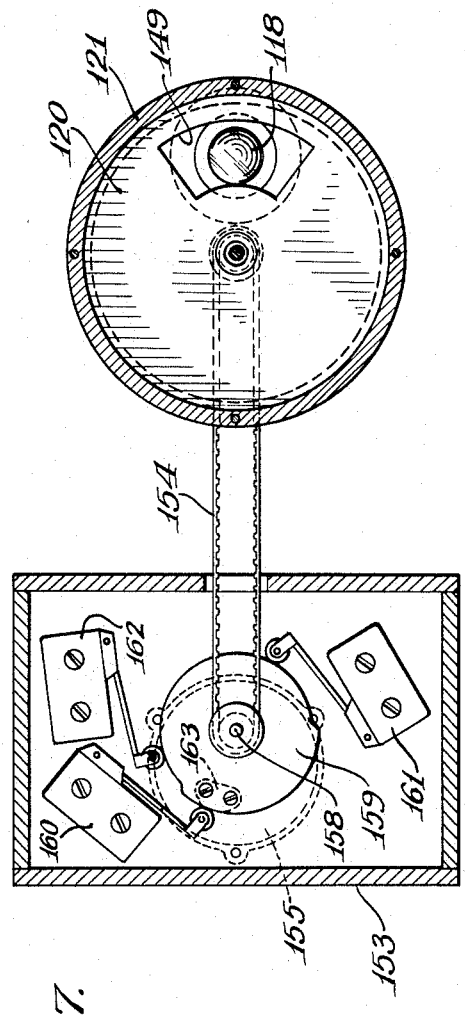
FIGURE 7 is a cross-sectional view of the shutter drive mechanism taken generally along the line 7—7 of FIGURE 6.

Operatively affixed to the motor shaft 158 and adapted to be driven therewith is a cam 159 which is adapted to sequentially operate a series of electrical switches. As best seen in FIGURE 7, the cam 159 will actuate a series of three switches. Switch 160, which is adapted to be actuated by lug 163 carried on cam 159, functions to terminate the operation of the shutter drive motor 155 at the end of each cycle of operation (at the end of one revolution of shutter 120). The switch 161, which engages the peripheral edge of cam 159, is adapted to control a frame counter step relay which is part of the electrical circuitry. The switch 162, which is also actuated from the peripheral edge of cam 159, is adapted to initiate energization of the frame advance motor 80.

FIGURE 8 is a bottom view of the film holder 59. Provided in the bottom of housing 90 is an elongated opening 105. It will be noted that film guide 109 has an opening 165 defined therein to permit exposure of the photosensitive film 104 through opening 164 in housing 90.

The face of the vacuum platen 110 is provided with a plurality of grooves intersecting one another at right angles to form a grid-like pattern. Openings 167 extending through the platen 110 communicate the grooves 166 with a source of vacuum pressure via openings or bores 171 in plate 172, openings or bores 173 in connecting block 111 and vacuum line 170 (FIGURE 9) A suitable control may be provided in the vacuum line to apply a vacuum pressure to the pressure plate at the commencement of exposing a panel of film and to terminate the vacuum pressure when exposure of the panel has been completed. In this way, the panel of film being exposed is positively retained by the vacuum platen 110 during the step and repeat operation.

Affixed within the film holder 59 between frame plates 172 and 174 is an annular lamp panel 168. The panel 168 extends beyond the vacuum platen 110 on all sides and is arranged to provide a framing border on each panel or preselected length of film. Such border has been found desirable in printing from the negative made of a panel of film 104.

Access may be provided to the compartments 91 and 92 in housing 90 by movable doors affixed to housing 90. Note door 175 in FIGURE 9.

Referring to FIGURE 10, there is shown in perspective the electro-luminescent lamp panel 168. The lamp panel is provided with an opening 180 adapted to seat against a raised or embossed portion 176 formed on plate 172. The opening 180 is surrounded by a peripheral nonluminescent border 181. The exterior edge of the lamp panel 168 is provided with a nonluminescent border 182. Between the two nonluminescent borders 181 and 182 is a luminescent area 183. A terminal area 184 adapted to be connected to an electrical circuit is provided in border 182. When the lamp panel 168 is energized, the entire area 183 will be lit to expose a framing border on a panel of film.

In FIGURES 3, 11, 12 and 13, there is illustrated the means for actuating the first carriage means 60 in a predetermined path with respect to the work to be photographed. As seen in FIGURE 3, such path is generally longitudinal of the copy to be photographed. The first carriage means is supported for movement on the base plate 63 along the guide track 64 and the roller track 65. The shaft 190 of the frame advance motor extends through an opening in the motor support bracket 191 and has affixed on the end thereof a drive cam 192. The drive cam 192 is operatively connected to a slide 193 by means of a crank arm 194. One end of crank arm 194 is pivotally connected to cam 192 as indicated at 202 and the other end of the crank arm is pivotally connected to slide 193 as indicated at 203. Slide 193 is supported for reciprocal movement within the slide support 195. Pawl 196, which is carried on a pivot 197 affixed to the slide 193, is adapted to engage teeth 198 on the rack 199 which is affixed to slide rail 66. During the first one-half revolution of the frame advance cam 192, the slide 193 will be moved to the right as viewed in FIGURE 11 and pawl 196 will move upwardly over a tooth 198 on the rack 199. During the second half revolution of cam 192, pawl 196 will engage the face of the next tooth 198 and advance the rack to the left as viewed in FIGURE 11. In this manner the carriage means 60 will be advanced incrementally or indexed.

At the conclusion of each revolution of the frame advance cam 192, the lug 208 on the cam will engage an arm of switch 209, thereby interrupting the electrical circuit to the frame advance motor 80, and stopping the frame advance motor.

At the conclusion of a predetermined advance along a line, in the illustrative embodiment, at the end of the fifth increment of advance, the frame return drive motor 82 will be actuated. Upon energization of the frame return drive motor 82, the drive motor shaft 210 will rotate as will the large cam wheel 211 fixed thereto. The reset crank arm 212, which is pivotally affixed at one end to the cam wheel 211 and at the other end to an arm 215 extending upwardly from the reset slide 213, will actuate the reset slide to the right as viewed in FIGURE 11. The reset crank arm 212 is pivotally affixed to the arm 215 by a swivel pivot means 214. Upon movement of the reset slide to the right as viewed in FIGURE 11 the reset lug 216 which extends upwardly from reset slide 213 will engage the face of the rack 199 and cause the rack and the rail 66 affixed thereto to be moved to its starting position. The carriage 60 is thereby repositioned at the beginning of a line.

At the same time that the reset slide 213 is moved to the right, as viewed in FIGURE 11, the roller 220 journaled on the pawl lift member 221 rides out of the recess 222 in the reset slide 213 and onto the top surface of the reset slide. The pawl lift member 221 is raised and the pawl is pivoted out of engagement with teeth 198 on rack 199. The pawl lift member 221 is ordinarily biased downwardly by a spring 223.

As best seen in FIGURES 3, 12 and 13, the reset slide 213 comprises a pair of bar members 213a and 213b operatively connected together adjacent one end by the arm member 213 and adjacent the other end by reset lug 216.

It is to be noted that the reset crank arm 212 is comprised of arm members 212a and 212b interconnected by adjustable telescoping joint 212c. Spring member 226 biases the arm members 212a and 212b of the crank arm 212 toward one another to maintain the arms in operative relationship.

Carried on the cam wheel 211 is a lug 228 adapted to engage an arm of the switch 233 for terminating operation of the frame return motor 82 at the end of a single revolution of shaft 210. Also affixed on the cam wheel 211 is a lug member 232 which is adapted to engage sequentially a plurality of switches affixed on the frame return motor bracket 230 adjacent to the cam wheel 211. The switch 235 is actuated by the lug 232 on cam wheel 211 to clear the frame count step relay in the electrical circuit. The switch 231 operates a line count step relay in the electrical circuit. The switch 234 starts the line advance motor 86. The operation of the electrical switches will be more fully explained hereinafter.

Referring now to FIGURES 3, 4, 14 and 15, there is shown the means for driving the carriage means 62 transversely on the carriage means 60. The shaft 240 of the line advance motor 86 extends through an opening in the line advance motor support bracket 241. Fixed to the end of shaft 241 is a cam 242. A crank arm 243 is pivotally connected at one end to the cam 242 and at the other end, the crank arm is pivotally connected to a slide 244. The slide 244 is guided for movement in a slide support 245. Pivotally connected on pivot 247 on the slide 244 is a pawl member 246. The pawl 246 is adapted to engage teeth 248 on the rack 128. As rack 128 is fixed to one end of the film housing 90, movement of the rack will cause movement of the film housing 90 incrementally in a path transversely of the second carriage 62 along the guide track 69 of the second carriage.

At the end of each revolution of the line advance motor 86, the lug 250 on the cam 242 will engage in arm of the switch 251 and terminate the operation of the line advance motor.

It will be noted that in the illustrated embodiment of the invention, four teeth 248 are provided on rack 128. Thus, the carriage 62 may be moved to expose four separate lines of frames on the panel of film. After four lines or rows of frames have been exposed on the desired section of film, the line return motor 88 is energized. Upon energization of the line return drive motor 88, the shaft 254 thereof is rotated. Cam wheel 255 fixed to shaft 254 will also rotate. A crank arm 256 is pivotally connected at one end to cam wheel 255. The other end of crank arm 255 is pivotally joined to arm 257 which extends upwardly from the reset slide 258. The reset slide 258 engages with and is movable along the guide track 260 affixed to the first carriage means 60 adjacent guide track 69. The reset slide 258 includes a pair of bar members 258a and 258b interconnected adjacent the ends by arm means 257 and a reset lug 261, respectively. In operation, when the line return drive motor 88 is actuated, the cam wheel 255 will be rotated to move the crank arm 256 and actuate the reset slide 258 to the right as viewed in FIGURE 14. The reset lug 261 will engage the leading edge of the rack 128 and cause the rack to be moved to the right as viewed in FIGURE 14, thereby moving carriage 62 to its starting position.

It will be understood that at the beginning of the return or resetting movement of the reset slide 258, the roller 264, which is normally in the recess 265 in one of the bar members of the reset slide, will ride up the incline out of recess 265. The pawl lift member 266 upon which the roller 264 is journaled will be raised. The projection 268 on the pawl lift member 266 will lift the pawl 246 from engagement with the rack teeth 248 and thereby permit the return of the carriage means 62 to its starting position without damage to the pawl 246 or the teeth 248 on rack 128.

Mounted on the line return motor drive bracket 270 adjacent to the periphery of the cam wheel 255 are a pair of switches 271 and 272 which are adapted to be actuated by a cam lug 273 affixed on the wheel 255. The switch 271 is adapted to terminate operation of the line return motor 88 and the switch 272 is adapted to clear the line step count relay in the electrical circuit.

It is to be noted that the crank arm 256 is constructed in a manner similar to the crank arm 212 of the frame reset linkage. The crank arm 256 comprises a first arm portion 256a pivotably affixed at one end to the cam wheel 255 and a second portion 256b which is pivotally affixed at its far end to the arm 257 of the reset slide 258. The two portions of the crank arm 256 are telescopically and adjustably connected by the joint member 256c. Spring 275 urges the telescoping portions toward one another in order to maintain the operative engagement of the sections of the arm 256.

Considering now FIGURES 16, 17 and 18, there is illustrated the attachment lens means 46 utilized for applying a title or heading to the preselected panel of film. The housing 278 of the attachment 46 is affixed beneath the base plate 63. The housing 278 comprises a box-like member having an opening at each end thereof. The opening 276 at the top of housing 278 is in communication with the aperture 77 defined in the aperture plate 78 affixed to the bottom of the base plate 63.

Attached to the lower end of the offset box-like housing 278 is a shutter housing 280. An aperture or opening 281 in the top of the shutter housing 280 communicates with the interior of the housing 278. Within the shutter housing 280 is a movable shutter 282 actuated by a solenoid 283. The solenoid 283 is adapted to pivot or rotate the shutter 282 out of alignment with the opening 281 and thereby permit the passage of light through the lens 284 and the opening 281 into the housing 278. The light entering the housing 278 from the shutter mechanism will be reflected from the mirror 286 to the mirror 288 onto the film carried in the film housing 59. A baffle 290 is provided in the housing 278 to better channel the light entering the housing 278 onto the mirror 286.

As indicated in FIGURE 19, the side walls 292 of the housing 278 are provided with a plurality of saw teeth or ridges 293 for the purpose of minimizing reflection from the walls of the housing.

Referring now to FIGURES 20, 21, 22 and 23, there is illustrated the title stand attachment of the present invention. The title stand comprises a base or support member 310 connected to the top 16 of the table 14 by fastening means 311, as for example, screws. Slidably carried in recesses 312 and 313 in the side walls 314 and 315 of the bracket 310 is a slide base 316. Provided in the slide base 316 is a slot or recess 318 adapted to receive a heading or caption member. Elongated strip members 308 and 309 are connected to the slide base 316 for retaining a heading strip in place in slot 318.

Also carried on the slide base 316 is a bracket 319 for supporting a pair of lights 320 and 321 for illuminating the title strip to be photographed. Reflectors 322 and 323 are attached to bracket 319 and are associated with the lights 320 and 321, respectively.

Affixed to the side of the slide base 316 is a handle 325 for moving the slide base 316, as well as the lights and heading strip carried thereon, from a position indicated in solid line in FIGURE 20 to a position indicated in dotted line in FIGURE 20. Upon movement of the slide base 316 to a position outwardly from the bracket 310, the heading strip 326 carried thereon will be in alignment with the lens 284 of lens means 46. When the lights 320 and 321 are lit and the shutter 282 in lens means 46 is actuated, the heading or title will be exposed on a predetermined portion of the panel of film.

An example of a heading strip is shown in FIGURE 24. The heading strip 326 may be made from paper or like material. The indicia 327 appearing upon the heading strip 326 are preferably made in a contrasting color to the background on the heading strip 326 for clarity.

Referring now to FIGURES 25 through 28, there is illustrated schematically the exposure of a plurality of frames upon a preselected panel 328 of photosensitive film 104 in a predetermined orderly manner utilizing the step and repeat camera mechanism 12 of the present invention. It is to be noted that no heading is to be applied to the panel 328. In FIGURE 25, there is illustrated the position of the film 104 with respect to the frame or copy aperture 76 and the heading or title aperture 77 preparatory to exposing panel 328 to the first of twenty frames (four lines of five frames each). As the first shutter operation is completed, the frame advance drive motor is actuated to index or move the carriage means 60 one increment to the right to prepare the panel for exposure No. 2. When the carriage is properly indexed, the shutter will again be actuated to expose exposure No. 2 on panel 328 of film 104. The incremental movement of the carriage means 60 and the actuation of the shutter will be repeated until the fifth exposure has been exposed on the film 104.

At the conclusion of the fifth exposure, the frame return drive motor 82 is actuated to reset the panel of film (FIGURE 26).

At the conclusion of the frame reset operation, the transverse indexing drive motor or the line advance drive motor 86 is actuated to step down the film holder 59 and the film 104 carried therewith. The panel 328 is positioned to align the portion of panel to receive exposure No. 6 with the copy aperture 76 (FIGURE 27). The film holder 59 will then be indexed or moved incrementally along the second line to make exposures Nos. 7, 8, 9 and 10.

At the completion of the second line of frames, the frame return drive motor 82 will be actuated to reset the film holder 59. Then the carriage means 62 will be actuated to step down the film holder to the third line position. This operation will continue until the twenty frames indicated on FIGURE 28 have been exposed on the panel 328 of film 104.

After the exposure of the twentieth frame, and resetting of the fourth line, the transverse return drive motor or line return motor 88 will be actuated to reposition the film strip 104 in its starting position over aperture 76. The film reel drive motor 92 may then be actuated to move the film 104 into position for exposure of the next succeeding panel.

With respect to FIGURE 28, it should be noted that when the fourth line of frames is being exposed to frames Nos. 16–20, there will be no double exposure of frames Nos. 1–5 for the shutter 282 of lens means 46 will remain closed.

Referring now to FIGURE 29, there is illustrated the starting position of a film panel 329 when a heading or title is to be exposed to the photosensitive film. It is seen that film holder is oriented so that the first frame will be exposed in what is referred to as the second line of operation, with the first line of operation being reserved for the heading or title. The film holder 59 will be indexed through the aforedescribed operation until three lines of five frames each have been exposed.

At the completion of the fifteenth frame, the film holder provides alignment with the first line on panel 329 with the heading or title aperture 77. The shutter 282 of the attachment 46 will then be actuated and the heading will then be exposed on the film as indicated in FIGURE 30.

In FIGURE 31, there is illustrated a completed panel 328 of film having twenty frames exposed thereon. Each of the frames Nos. 1–20 is separated from adjacent frames by separation lines 340. The grid-like pattern of separation lines are made by slightly overlapping the adjacent frames as each is exposed, thus causing a double exposure of the overlapped areas. Adjacent the peripheral edge of panel 328 is a black border 341. The border 341 is made by exposing the panel 328 to the lamp panel 168 which is built into the film holder 59 of the camera 12. An indexing mark 342 is provided in border 341 to facilitate automatic cutting of the negatives into units, and/or automatic cutting of duplicates printed from the camera negative.

In FIGURE 32, there is illustrated a completed film panel which has fifteen frames and a heading or title portion 344 thereon. The strip 329 includes the frame separation lines 340 and peripheral black border 341, which separation lines and border are made in the same manner as was explained above with respect to FIGURE 31.

Referring now to FIGURE 33, there is illustrated schematically the electrical circuitry for the step and repeat camera mechanism of the present invention. To commerce operation of the camera, the foot switch 350 is actuated by the operator, thereby opening the contact 350a and closing the contact 360b. A circuit is completed, via line L1, capacitor 352, contact 384b, contact 350b and line L2, charging the capacitor 352. When the foot switch 350 is released by the operator, the capacitor discharges through the coil 354 in relay 156 (FIGURE 6) energizing the coil. The contact 354a is moved from a normally open position to a closed position, thereby completing a circuit to the shutter motor 155 and energizing the shutter motor. Thus, a first exposure (frame No. 1 in FIGURE 25) is made on the photosensitive film in the camera. The switch 160 is actuated by cam 159 (FIGURE 7) to open the circuit to the shutter motor 155 at the end of a single revolution of the cam 159.

The shutter motor cam 159 also operates a switch 161 which control the frame counter step relay and indicator mechanism 356. Voltage is removed from the step relay contacts by switch 161 during the step operation. The six-volt transformer 357 supplies power through the step relay contacts to a projection-type indicator mechanism, which comprises a part of mechanism 356.

After the count operation is complete and the shutter 120 of the lens mechanism 13 is closed, the shutter motor cam 159 operates the switch 163. Upon closing of switch 163, a circuit is completed to energize frame advance motor 80 to move the film holder 59 together with carriage means 60 to the next frame position. The frame advance motor 80 is deenergized at the end of one cycle by means of switch 209 which is actuated by a cam 192 carried on the shaft 190 of the frame advance motor 80. The indexing operation is repeated until the last exposure on the predetermined line is made upon the photosensitive film.

It should be noted that the camera is set for one format or for a predetermined operation prior to actuation of the foot switch 350. For example, a panel of photosensitive film three inches by five inches may be exposed to twenty frames in a pattern comprised of four lines of five frames each. In such operation, when the fifth exposure is counted at the end of the first line, the step relay mechanism 356 completes the circuit to the transformer 358, thereby energizing the relay 359. It will be noted that the transformer is utilized to provide 115 volts for operation of each of the relays. The various indicator lights in the circuit will be operated from an auxiliary six-volt circuit supply from the transformer 357.

Upon energization of relay 359, the contact 359a opens the circuit to the frame advance motor 80 and completes a circuit to the frame return motor 82. When the switch 163 is closed, a circuit will be completed to the frame return motor 82 rather than the frame advance motor 80. The frame return motor 82 will be energized for one revolution through the switch 233. As the frame return motor is rotated, the cam wheel and associated linkage will cause the carriage means 60 to be returned to its initial position at the start of a line.

During operation of the frame return motor 82, the frame return motor cam 228 sequentially operates the switches 231, 235 and 234. The switch 231 clears the frame count step relay mechanism 356 and also removes voltage from the step contacts during the reset or clearing operation.

The switch 235 operates the line count step relay and indicator mechanism 360. The switch 235 also removes voltage from the line count step relay contacts during the step action.

The switch 234 starts the line advance motor 86 (except when a panel of photosensitive film has been fully exposed, as will be more fully set forth hereafter).

When the last frame position is reached, that is, after the fifth frame on the fourth line has been exposed, the latch coil 362 of the latch and unlatch relay is energized. Voltage has been supplied to the contact 359b during the time the fourth frame was exposed. When the fifth frame on the fourth line is reached, the relay 359 is energized and power is supplied through transformer 364 to the latch coil 362.

Upon energization of the latch coil 362, the following actions occur:

(1) Contact 362a is opened so that the shutter switch 163 does not start either the frame advance motor 80 or the frame return motor 82.

(2) Contact 362b is actuated to break the circuit to switch 234 so that when the frame return motor 82 is energized (through the programming circuit to be described later) the line advance motor 86 will not be energized. The contact 362b closes a circuit to start the programming motor 366.

Upon actuation of the programming motor 366, the contact 366a is closed to hold the programming motor 366 on for one cycle of operation. The contact 366b is closed, as will be more fully explained hereafter. The contact 366c is closed to energize the electro-luminescent panel lamp or border light 168 through transformer 365 to expose the border around the micro picture area. The contact 366d is closed momentarily to energize the film wind motor 98. This motor is maintained in operation by switch 116 which is operated by a cam 115 on the film measuring roller 113 (FIGURE 4). The switch 107 is actuated in response to a predetermined low supply of film on the film supply reel. Upon closing of the switch 107, a buzzer 368 is sounded to warn the operator that the supply of film is low or that the film holder is out of film. The contact 366e is closed during actuation of the programming motor 366 to energize the frame return motor 82. The contact 366f is closed to energize the line return motor 88. Contact 366g is closed momentarily to energize the unlatch coils 362A and 379A.

By the aforenoted sequence of operation, the panel or preselected length of strip of photosensitive film has been moved onto the take-up reel in the camera film holder to prepare a second panel for exposure and the carriage means 60 and 62 have been repositioned to their starting positions preparatory to continuing the photographing operation.

If it is desired that a heading be placed on the three-inch by five-inch panel, then the camera must be programmed prior to making the first exposure. In the aforenoted preferred embodiment of the invention which was described when a three-inch by five-inch panel was being used, the first line must be skipped to provide space for the required heading. The camera is readied for a heading operation by pressing the "program for heading" push button 370. Closing of the heading push button 370 charges a capacitor 376 which is discharged through and energizes the coil 378 of the heading programming relay and the heading latch coil 379. The coil 378 holds in momentarily and starts the line advance motor 86 when contacts 378a close. Upon closing of the contacts 378b, the line counter step relay mechanism 360 is actuated to count the line. The remainder of the negative panel is exposed in the usual manner until the last exposure is made. The film is then in position for the heading, that is, the heading area on the panel is in vertical alignment with the heading aperture 77 in base plate 63. As the latch coil 379 is deenergized, the contact 379a is opened and the programming motor 366 is deenergized. The programming motor will not be energized until the heading push button 374 is actuated.

The slide on the title stand 48 is then slid into position wherein the heading is disposed beneath the attachment lens and the push button 374 is pushed. This starts the programming motor 366 as before except that this time when the heading exposure contact 366b is closed, a circuit is completed through the contact 379c, the control 391, and the heading shutter solenoid 283, energizing the solenoid. The heading lights 320 and 321 are lit and the shutter 282 (FIGURE 16) in the attachment lens 46 is operated to expose the heading on the panel of film. The main camera light means 30 and 31 are turned off at this time.

If the negative panel is not completed and there is no more work to be photographed, the balance of the negative panel must be "blanked" out. This blanking out may be accomplished by photographing plain white paper with the main camera light means 30 and 31 on. The blanking operation may be done automatically by the step and repeat camera mechanism of the present invention. The blanking push button 380 is pressed and the foot switch 350 is operated to start the camera. The relay 382 is energized upon closing of the push button 380 and is held in by the contact 382a until the end of the negative panel is reached and the normally closed contact 382b is opened. A relay (not shown) connects the main camera light means 30 and 31 to full line voltage so that the negative panel is fully exposed in the blanked area.

The contact 382b changes the connection to the exposure hold-off relay 384 so that the exposure for the blanking operation may be automatically repeated.

The relay 384 is energized whenever any motor (except shutter motor 155) is operating, while the latch coil 362 is energized, and while the programming motor 386 is operating. The relay 384 prevents exposure of the film while the film is being moved in the film holder 59. In addition, the relay 384 provides for automatic operation during "blanking."

Two indicator lights 387 and 388 are mounted on the frame structure in view of the camera operator. The light 388, which may be red, is lit when relay 354 is energized. This light indicates to the operator that an exposure is being made. The second light 387 may be amber in color and indicates to the operator that an exposure has been completed and that the work or copy to be photographed can be changed. The next exposure cannot be made until the light 387 goes off.

A solenoid valve (not shown) may be provided to remove the vacuum from the platen 110 while the film wind motor 98 is running.

A pilot light 381 may be provided to show when the camera has been programmed for performing a titling or heading operation. The pilot light 381 may be provided to indicate that the camera is ready to have the heading or title exposed.

Transformer 385 is provided to supply low voltage power for the indicator lights in the line step relay circuitry.

The line step relay mechanism 360 may include a projector-type indicator to show the exact frame being exposed. A suitable colored background light may be lit when the camera is on the last line and when the next to the last exposure on the last line is about to be exposed.

When the supply of film has been exhausted and a new supply reel has been inserted into the film holder 59, or if the film holder has been moved for any reason, or if it is desired to start a negative panel over because a mistake has been made, the film holder 59 must be moved to the start or the first frame position indicated in FIGURE 25. This repositioning operation may be performed by pressing the reset button 389, thereby energizing the programming motor 386. The contact 386a is closed to operate the programming motor 386 through one cycle of operation. The contact 386b is closed to energize the frame advance motor 80. The contact 386c is closed to energize the frame return motor 82, which in turn energizes the line advance motor 86 through switch 234. The contact 386d is closed to energize the line return motor 88. Contact 386e is closed to energize the unlatch coils 370 and 372.

To move new film into position, the film wind push button 390 may be actuated. It will be understood that during normal operation, the film will be indexed automatically in the film holder 59.

The present invention provides a novel step and repeat camera mechanism capable of exposing a plurality of frames of copy on a panel of photosensitive film in a predetermined arrangement. The camera mechanism can easily be adapted to utilize film of different size and to vary the number of frames exposed on each panel of film. If desired, a heading or caption can be readily exposed upon a panel by use of the title lens means and title stand.

The camera mechanism is provided with novel lamp panel means for exposing a border on the panel during the step and repeat operation. The resultant negative panels obtained after developing the film are ideally suited for the printing of microphotographic cards.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new, and desire to secure by Letters Patent of the United States, is:

1. A microphotographic device for exposing a plurality of pages of copy in a predetermined orderly arrangement on a panel of photosensitive film comprising, in combination, frame structure, means for maintaining copy to be photographed in a first plane on said frame structure, camera means for sequentially photographing the pages of copy, first carriage means supporting said camera means for longitudinal movement in a second plane parallel to and spaced from said first plane, second carriage means on said first carriage means supporting said camera means for transverse movement in a plane parallel to said first plane, indexing means for actuating said first carriage means including an advance drive motor for moving the first carriage means incrementally and a return drive motor, indexing means for actuating said second carriage means in response to predetermined movement of said first carriage means including an advance drive motor for moving the second carriage means incrementally and a return drive motor, and means for moving said film incrementally in said camera means after a panel has been exposed to a predetermined number of pages of copy.

2. A microphotographic device comprising, in combination, frame structure, means on said frame structure for supporting the work to be photographed in a first predetermined plane, a camera having a film housing and lens mens, and carriage means for supporting said film housing for movement in a second predetermined plane parallel to said first plane and spaced therefrom, said carriage means comprising a first carriage assembly movable longitudinally with respect to said work supporting means, a second carriage assembly movable transversely with respect to said work supporting means in a predetermined sequence with respect to movement of said first carriage, said first carriage means being supported and guided for movement on said frame structure on a first guide track extending longitudinally of the work and first roller means disposed longitudinally of the work, said second carriage means being supported and guided on a second guide track affixed to said second carriage means along one side thereof and disposed perpendicularly with respect to said first guide track and second roller means operatively associated with an opposite side of said second carriage means and disposed perpendicularly with respect to said first roller means, first drive means for actuating said first carriage including an advance drive motor for moving said first carriage incrementally and a return drive motor, and second drive means for actuating said second carriage including an advance drive motor for moving said second carriage incrementally and a return drive motor.

3. A step and repeat camera mechanism for exposing selected portions of photosensitive film in a predetermined linear pattern comprising frame means, a step and repeat camera on said frame means including a film holder and lens means, means on the frame means for orienting work to be photographed in a plane at a predetermined fixed focal distance from the lens means, first carriage means movable on said frame means in a plane parallel to the plane of said work orienting means, second carriage means movable on said first carriage means, said film holder being supported on said second carriage means, said lens means including a movable shutter, means for actuating said shutter to expose a portion of said photosensitive film, drive means for selectively moving said first and second carriage means, and control means for actuating said drive means and said shutter actuating means through a predetermined sequence of operation for exposing a panel of photosensitive film in a predetermined linear pattern, said drive means being constructed to move each of said carriage means back and forth in a planar path, said drive means including advance drive motor and a return drive motor for moving said first carriage means and an advance drive motor and a return drive motor for moving said second carriage means.

4. A step and repeat camera mechanism as in claim 3 wherein said first carriage means engages a guide track for guiding the first carriage means in a predetermined path with respect to the work to be photographed, said first carriage means having a guide track thereon disposed transversely to the predetermined path of said first carriage means for guiding the second carriage means in a path transverse to the path of movement of said first carriage means.

5. A step and repeat camera mechanism for exposing selected portions of photosensitive film in a predetermined pattern comprising frame means, a step and repeat camera on said frame means including a base plate, a film holder movably supported on said base plate, and lens means fixed to said base plate, means defining a copy aperture in said base plate, means on the frame means for orienting copy to be photographed in a plane at a predetermined fixed focal distance from the lens means, first carriage means movable along said frame means in a plane parallel to the plane of said copy orienting means, second carriage means movable on said first carriage means, said film holder being supported on said second carriage means, said lens means including a movable shutter, means for actuating said shutter to expose a portion of said photosensitive film, drive means for selectively moving said first and second carriage means, said drive means including a first advance motor for moving said first carriage means, connecting means for operatively connecting said first advance motor to said first carriage means for advancing said first carriage means incrementally and a first return drive motor for returning said first carriage means, and a second advance motor for moving said second carriage means, connecting means for operatively connecting said second advance motor to said second carriage means for advancing said second carriage means incrementally, and a second return drive motor for returning said second carriage means and control means for actuating said drive means and said shutter actuating means through a predetermined sequence of operation for exposing plurality of frames on a panel of photosensitive film in a predetermined pattern.

6. A step and repeat camera mechanism for exposing selected portions of photosensitive film in a predetermined pattern comprising frame means, a step and repeat camera on said frame means including a base plate, a film holder movably supported on said base plate, and lens means fixed to said base plate, means defining a copy aperture in said base plate, means on the frame means for orienting copy to be photographed in a plane at a predetermined fixed focal distance from the lens means, first carriage means movable along said frame means in a plane parallel to the plane of said copy orienting means, second carriage means movable on said first carriage means, said film holder being supported on said second carriage means, said lens means including a movable shutter, means for actuating said shutter to expose a portion of said photosensitive film, drive means for selectively moving said first and second carriage means, and control means for actuating said drive means and said shutter actuating means through a predetermined sequence of operation for exposing plurality of frames on a panel of photosensitive film in a predetermined pattern, means defining a title aperture in said base plate, a title stand for supporting a title to be photographed and exposed upon said panel of film, title lens means including a movable shutter carried on said base plate offset from said title aperture, and means for actuating said title lens means shutter to selectively expose a title upon said panel of photosensitive film.

7. A microphotographic device for exposing a plurality of pages of copy in a predetermined orderly arrangement on a panel of photosensitive film comprising, in combination, frame structure, means for maintaining copy to be photographed in a first plane on said frame structure, camera means for photographing selected pages of copy, said camera means comprising a movable film box and stationary lens means, first carriage means reciprocable in a second plane parallel to and spaced from said first plane, second carriage means on said first carriage means supporting said film box for transverse movement in a plane parallel to said first plane, frame drive means for actuating said first carriage means incrementally in a first direction include a frame advance motor, frame return drive means for resetting said first carriage means including a frame return motor, line drive means for actuating said second carriage means incrementally in response to predetermined movement of said first carriage means including a line advance motor, line return drive means for resetting said second carriage means include a line return motor, and means for moving said film incrementally in said camera means after a panel has been exposed to a predetermined number of pages of copy.

8. A microphotographic device as in claim 7 wherein said frame drive means includes a first cam wheel operatively connected to said frame advance motor, and pawl and ratchet means connecting said first cam wheel and said first carriage means, and said line drive means includes a second cam wheel operatively connected to said line advance motor and pawl and ratchet means connecting second cam wheel and said second carriage means.

9. A microphotographic device as in claim 7 including a drive cam and pawl and rack means for operatively connecting the frame advance motor to the first carriage means, and a cam wheel, crank arm, and reset slide operatively connecting the frame return motor to the first carriage means, and a drive cam and pawl and rack means for operatively connecting the line advance motor to the second carriage means, and a cam wheel, crank arm, and reset slide operatively connecting the line return motor to the second carriage means, and electrical means for energizing the advance motors and return motors sequentially including starting control means and switch means actuated by the drive cams and cam wheels, respectively.

10. A microphotographic device comprising, in combination, frame structure; means on said frame structure for maintaining the work to be photographed in a first predetermined plane; a camera comprising a base, a movable film housing and a stationary lens means; carriage means for supporting said film housing for movement in a second predetermined plane parallel to said first plane and spaced therefrom, said carriage means comprising a first carriage assembly movable longitudinally with respect to said work maintaining means, a second carriage assembly movable transversely on said first carriage assembly in a predetermined sequence with respect to movement of said first carriage assembly, said first carriage assembly being supported and guided for movement on said base on means comprising a first guide track extending longitudinally of the work, and first roller means disposed longitudinally of the work, said second carriage assembly being supported and guided on a second guide track affixed to said second carriage assembly along one side thereof and disposed perpendicularly with respect to said first guide track and second roller means operatively associated with an opposite side of said second carriage assembly and disposed perpendicularly with respect to said first roller means, and means for actuating the first and second carriage assemblies in a predetermined sequence so as to expose a panel of film within the film housing to a preselected number of lines of frames, each line containing a predetermined number of frames, said base having means defining a copy aperture and a title aperture, said film housing being movable with respect to said base to align selected portions of said panel of film with said apertures, title lens means on said base including a movable shutter mechanism, said stationary lens means including a movable shutter mechanism, and means for selectively actuating one or the other of said shutter mechanisms to selectively expose a predetermined portion of said panel of film.

11. A microphotographic device as in claim 10, wherein said base has means defining a copy aperture and a title aperture, said film housing being movable with respect to said base to align selected portions of said panel of film with said apertures, title lens means on said base including a movable shutter mechanism, said stationary lens means including a movable shutter mechanism, and means for selectively actuating one or the other of said shutter mechanisms to selectively expose a predetermined portion of said panel of film.

References Cited by the Examiner

UNITED STATES PATENTS

| | | | |
|---|---|---|---|
| 1,734,780 | 11/1929 | Simjian | 95—37 |
| 2,139,956 | 12/1938 | Huebner | 95—36 |
| 2,296,655 | 9/1942 | Stuart. | |
| 2,386,276 | 10/1945 | Simjian. | |
| 2,731,893 | 1/1956 | Kling et al. | 95—11 |
| 2,763,182 | 9/1956 | Urban et al. | 88—24 |
| 2,788,705 | 4/1957 | Huebner | 88—24 |

NORTON ANSHER, *Primary Examiner.*

RICHARD A. WINTERCORN, *Assistant Examiner.*